(12) United States Patent
Krunz et al.

(10) Patent No.: US 10,972,172 B2
(45) Date of Patent: Apr. 6, 2021

(54) METHOD FOR FAST BEAM SWEEPING AND DEVICE DISCOVERY IN 5G MILLIMETER WAVE AND UPPER CENTIMETER-WAVE SYSTEMS

(71) Applicant: Arizona Board of Regents on behalf of the University of Arizona, Tucson, AZ (US)

(72) Inventors: Marwan Krunz, Tucson, AZ (US); Irmak Aykin, Tucson, AZ (US); Berk Akgun, Tucson, AZ (US)

(73) Assignee: Arizona Board of Regents on behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 16/593,867

(22) Filed: Oct. 4, 2019

(65) Prior Publication Data

US 2020/0112360 A1 Apr. 9, 2020

Related U.S. Application Data

(60) Provisional application No. 62/742,206, filed on Oct. 5, 2018.

(51) Int. Cl.
*H04W 72/04* (2009.01)
*H04B 7/08* (2006.01)

(52) U.S. Cl.
CPC ........... *H04B 7/086* (2013.01); *H04W 72/042* (2013.01)

(58) Field of Classification Search
USPC ........................................................ 375/267
See application file for complete search history.

(56) References Cited

U.S. PATENT DOCUMENTS

| | | | |
|---|---|---|---|
| 2017/0303262 A1* | 10/2017 | Yuan | H04W 16/28 |
| 2018/0054790 A1* | 2/2018 | Islam | H04L 5/0048 |
| 2018/0109307 A1* | 4/2018 | Huang | H04W 72/046 |
| 2019/0230665 A1* | 7/2019 | Lopez-Perez | H04L 5/0073 |
| 2019/0288757 A1* | 9/2019 | Zhou | H04B 7/0617 |
| 2019/0327783 A1* | 10/2019 | Jung | H04W 76/19 |

(Continued)

OTHER PUBLICATIONS

3GPP TR 38.802 v14.2.0 (2017) 3rd Generation Partnership Project; Technical Specification Group Radio Access Network; Study on New Radio Access Technology Physical Layer Aspects (Release 14), 3GPP, Valbonne, France.

(Continued)

*Primary Examiner* — Eva Y Puente
(74) *Attorney, Agent, or Firm* — Quarles & Brady LLP

(57) ABSTRACT

A method of performing a beam alignment procedure in a mmW or upper centimeter wave system, usable for performing initial access (IA) for user equipment (UE) to establish a connection with a base station (BS) is disclosed. A UE receives a signal from a base station, divides a search space into a plurality of angular zones, locates a direction of peak received strength within each zone, and forms a beam along the direction of peak overall signal strength. The number of angular zones is chosen such that the probability that each zone contains one peak of signal strength exceeds some threshold. The method is applicable in mmW and upper cmW bands in both BS to UE and device-to-device (D2D) communications.

20 Claims, 11 Drawing Sheets

(56) References Cited

U.S. PATENT DOCUMENTS

2019/0349049 A1\* 11/2019 Li .................... H04B 7/0617
2019/0369201 A1\* 12/2019 Akkarakaran ........ G01S 5/0215

OTHER PUBLICATIONS

IEEE Std 802.11 ad (2012) Part 11: Wireless Lan Medium Access Control (MAC) and Physical Layer (PHY) Specifications, Amendment 3: Enhancements for Very High Throughput in the 60 GHz Band, IEEE Standards Association, New York.
Andrews, Jeffrey G. et al., "What Will 5G Be?" IEEE Journal on Selected Areas in Communications, vol. 32, No. 5, 1065-1082, Jun. 6, 2014.
Rangan, Sundeep, et al., "Millimeter-Wave Cellular Wireless Networks: Potentials and Challenges," Proceedings of be IEEE, vol. 102, No. 3, pp. 366-385, Mar. 2014.
Akdeniz, Mustafa Riza, et al., "Millimeter Wave Channel Modeling and Cellular Capacity Evaluation," IEEE Journal on Selected Areas in Communications, vol. 32, No. 6, pp. 1164-1179, Jun. 6, 2014.
Roh, Wonil, et al., "Millimeter-Wave Beamforming as an Enabling Technology for 5G Cellular Communications: Theoretical Feasibility and Prototype Results," IEEE Communications Magazine, Feb. 2014, pp. 106-113.
Rappaport, Theodore S., et al., "Millimeter Wave Mobile Communications for 5G Cellular: It Will Work!" IEEE Access, vol. 1, pp. 335-349, 2013.
Siordani, Marco, et al., "Comparative Analysis of Initial Access Techniques in 5G mmWave Cellular Networks," Annual Conference on Information Science Systems (CISS) 2016.
Abdelreheem, Ahmed, et al., "Location-Based Millimeter Wave Multi-Level Beamforming Using Compressive Sensing," IEEE Communications Letters, vol. 22, No. 1, pp. 185-188, Jan. 2018.
Siordani, Marco, et al., "A Tutorial on Beam Management for 3GPP NR at mmWave Frequencies," IEEE communications Surveys & Tutorials, vol. 21, No. 1, pp. 173-196, 2019.
Abari, Omid, et al., "Millimeter Wave Communications: From Point-to-Point Links to Agile Network Connections," HotNets-XV, Nov. 2016.
Hashemi, Morteza, et al., "Out-of-Band Millimeter Wave Beamforming and Communications to Achieve Low Latency and High Energy Efficiency in 5G Systems," IEEE Transactions on Communications, vol. 66, No. 2, Feb. 2018, pp. 875-888.
Ali, Anum, et al., "Millimeter Wave Beam-Selection Using Out-of-Band Spatial Information," IEEE Transactions on Nireless Communications, vol. 17, No. 2, Feb. 2018, pp. 1038-1052.
Lin, Xincong, et al., "Estimation of Broadband Multiuser Millimeter Wave Massive MIMO-ODFM Channels by Exploiting Their Sparse Structure," IEEE Transactions on Wireless Communications, vol. 17, No. 6, Jun. 2018, pp. 3959-3973.
Hashemi, Morteza, et al., "Efficient Beam Alignment in Millimeter Wave Systems Using Contextual Bandits," IEEE conference on Computer Communications, IEEE Infocom 2018, pp. 2293-2401.
Zhou, Anfu, et al., "Following the Shadow: Agile 3-D Beam Steering for 60 GHz Wireless Networks," IEEE conference on Computer Communications, IEEE Infocom 2018, pp. 2375-2383.
Alkhateeb, Ahmed, et al., "Compressed Sensing Based Multi-User Millimeter Wave Systems: How Many Measurements Are Needed?" IEEE International Conference on Acoustics, Speech, & Signal Processing, 2015, pp. 2909-2913.
Choi, Jinho, "Beam Selection in mm-Wave Multiuser MIMO Systems Using Compressive Sensing," IEEE Transactions on Communications, vol. 63, No. 8, Aug. 2015, pp. 2936-2947.
Yan, Han, et al., "Compressive Intial Access and Beamforming Training for Millimeter-Wave Cellular Systems," IEEE Journal of Selected Topics in Signal Processing, vol. 13, No. 5, Sep. 2019, pp. 1151-1166.
Bajwa, Waheed U., et al., "Compressed Channel Sensing: A New Approach to Estimating Sparse Multipath channels," Proceedings of the IEEE, vol. 98, No. 6, Jun. 2010, pp. 1058-1076.
Steinmetzer, Daniel, et al., "Compressive Millimeter-Wave Sector Selection in Off-the-Shelf IEEE 802.11 ad Devices," Proceedings of CoNEXT'17: The 13th International Conference on Emerging Networking Experiments and Technologies, Incheon, Republic of Korea, Dec. 2017, 12 pages.
Cheng, Xiantao, et al., "Compressive Sensing-Based Beamforming for Millimeter-Wave Ofdm Systems," IEEE Transactions on Communications, vol. 65, No. 1, Jan. 2017, pp. 371-386.
Marzi, Zhinus, et al., "Compressive Channel Estimation and Tracking for Large Arrays in mm-Wave Picocells," IEEE Journal of Selected Topics in Signal Processing, vol. 10, No. 3, Apr. 2016, pp. 514-527.
Alkhateeb, Ahmed et al., "Channel Estimation and Hybrid Preceding for Millimeter Wave Cellular Systems," IEEE Journal of Selected Topics in Signal Processing, vol. 8, No. 5, Oct. 2014, pp. 831-846.
Xiao, Zhenyu et al., "Enhanced Channel Estimation and Codebook Design for Millimeter-Wave Communication," IEE Transactions on Vehicular Technology, vol. 67, No. 10, Oct. 2018, pp. 9393-9405.
Alkhateeb, Ahmed et al., "Limited Feedback Hybrid Precoding for Multi-User Millimeter Wave Systems," IEEE Transactions on Wireless Communications, vol. 14, No. 11, Nov. 2015, pp. 6481-6494.
Iwen, Mark A., et al., "Adaptive Strategies for Target Detection and Localization in Noisy Environments," IEEE Transactions on Signal Processing, vol. 60, No. 5, May 2012, pp. 2344-2353.
Aykin, Irmak, et al., "FastLink: An Efficient Initial Access Protocol for Millimeter Wave Systems," 21sst ACM International Conference on Modeling, Analysis and Simulation of Wireless and Mobile Systems (MSWIM 2018), 9 pages.
Song, Xiaoshen, et al., "Fully-/Partially-Connected Hybrid Beamforming Architectures for mmWave Mu-Mimo," IEEE Transactions on Wireless Communications, vol. 19, No. 3, pp. 1754-1769 Mar. 2020.
Candes, Emmanuel J., "The restricted isometry property and its implications for compressed sensing," Science Direct, Theory of Signals/Mathmatical Analysis, C.R. Acad. Sci. Paris, Ser. I 346, Elsevier, 2008, pp. 589-592.
Candes, Emmanuel J. et al., "An Introduction to Compressive Sampling," IEEE Signal Processing Magazine, Mar. 2008, pp. 21-30.
Candes, Emmanuel J., et al., "Decoding by Linear Programming," IEEE Transactions on Information Theory, vol. 51, No. 12, Dec. 2005, pp. 4203-4215.
Baraniuk, Richard et al., "A Simple Proof of the Restricted Isometry Property for Random Matrices," Constructive Approximation (2008) 28, pp. 253-263.
Andes, Emmanuel et al., "Sparsity and incoherence in compressive sampling," Inverse Problems 23 (2007), IOP Publishing (Apr. 2007), pp. 969-985.
Al-Kadri, M. Omar, et al., "An Energy-Efficient Full-Duplex MAC Protocol for Distributed Wireless Networks," IEEE Nireless Communications Letters, vol. 5, No. 1, Feb. 2016, pp. 44-47.
Medepalli, Kamesh, et al., "Voice Capacity of IEEE 802.11a and 802.11g Wireless LANs," IEEE Communications Society, Globecom 2004, pp. 1549-1553.
Kue, Chunlin, et al., "An Efficient Beam-Training Scheme for the Optimally Designed Subarray Structure in mmWave LoS Mimo Systems," EURASIP Journal on Wireless Communications and Networking (2017) 2017:31, 12 pages.
Song, Xiaoshen, et al., "A Scalable and Statistically Robust Beam Alignment Technique for Millimeter-Wave Systems," IEEE Transactions on Wireless Communications, vol. 17, No. 7, Jul. 2018, pp. 4792-4805.
Shafi, Mansoor, et al., "5G: a Tutorial Overview of Standards, Trials, Challenges, Deployment, and Practice," IEEE Journal on Selected Areas in Communications, vol. 35, No. 6, Jun. 2017, pp. 1201-1221.
Jungnickel, Volker, et al., "The Role of Small Cells, Coordinated Multipoint, and Massive Mimo in 5G," IEEE communications Magazine, May 2014, pp. 44-51.
Barati, C. Nicolas, et al., "Initial Access in Millimeter Wave Cellular Systems, " IEEE Transactions on Wireless communications, vol. 15, No. 12, Dec. 2016, pp. 7926-7940.

(56) References Cited

OTHER PUBLICATIONS

Irmer, Ralf, et al., "Coordinated Multipoint: Concepts, Performance, and Field Trial Results," IEEE Communications Magazine, Feb. 2011, pp. 102-111.
3GPP TR 36.814 v9.2.0 (2017-03), 3rd Generation Partnership Project; Technical Specification Group Radio Access Network; Evolved Universal Terrestrial Radio Access (E-UTRA); Further advancements for E-UTRA physical layer aspects (Release 9), 3GPP (2017), Valbonne, France.

* cited by examiner

METHOD FOR FAST BEAM SWEEPING AND DEVICE DISCOVERY IN 5G MILLIMETER WAVE AND UPPER CENTIMETER-WAVE SYSTEMS

CROSS-REFERENCE TO RELATED APPLICATIONS

This application is a utility application claiming priority from and benefit of the filing date of U.S. Provisional Patent Application No. 62/742,206 titled "A Method for Fast Beam Sweeping and Device Discover in 5G Millimeter Wave and Upper Centimeter-Wave Systems" filed on Oct. 5, 2018, the entirety of which, including all attachments and exhibits, is incorporated herein by reference.

STATEMENT REGARDING FEDERALLY SPONSORED RESEARCH OR DEVELOPMENT

This invention was made with government support under Grant Nos. 1409172 and 1513649 awarded by NSF. The government has certain rights in the invention.

TECHNICAL FIELD

The present invention is related generally to mutual beam steering and beam formation between two radio transceivers. Embodiments of the invention include an improved method and design for establishing initial access ("IA") between a base station transceiver ("BS") and user equipment transceiver ("UE") in 5G wireless systems, or between two user devices in device-to-device communications over millimeter wave (mmW) bands and upper centimeter-wave (cmW) bands. Inventive embodiments also have applicability in any system of radio transceivers with directional antennas, transmitting and receiving under certain frequency conditions, and in which forming transmit and receive directional antenna beams is a concern.

BACKGROUND

To cope with the ever-increasing demand for wireless capacity, the Federal Communications Commission (FCC) in the US, and other spectrum regulatory agencies around the world, have opened up various segments of the millimeter-wave (mmW) spectrum for broadband wireless access. These segments include various licensed bands within the 24-29 GHz and 37-39 GHz regions, as well as unlicensed bands between 57 and 71 GHz. The abundant spectrum in mmW bands is vital to meeting the high demands of next-generation wireless technologies, including 5G cellular systems, WLANs (e.g., WiGig), Internet of Things (IoT), and connected and autonomous vehicles. However, extending wireless communications into mmW bands faces many challenges, including high channel losses, poor penetration through walls and objects, and atmospheric absorption at certain mmW frequencies. These challenges limit signal coverage and hinder communication. At the same time, due to the much smaller wavelengths in mmW bands, a large number of antenna elements can be packed into a single device without increasing its form factor. With proper processing of signals fed into these antenna elements, transmissions can be beamed along a desired direction. The severe signal attenuation in the mmW bands can then be compensated for by the beamforming gain obtained with the use of antenna arrays.

Depending on the beamforming architecture, the beamforming "weights" that are used to focus the signal along a particular direction can be applied in the digital or analog domain (or both). Digital beamforming is accomplished by multiplying a particular coefficient (a complex number) by the modulated baseband signal for each RF chain. Analog beamforming, on the other hand, applies complex coefficients to alter the RF signals by controlling phase shifters. Finally, in hybrid (analog/digital) beamforming, the signal processing is divided between the analog and digital domains, allowing a comparable performance to digital beamforming but with fewer RF chains.

Beamforming allows highly directional communications, thus increasing the spatial reuse. This, however, comes at the cost of complicating various control functions, including the initial access (IA) procedure. IA allows a user equipment (UE) to establish a connection with a base station (BS). In current 4G/LTE systems, IA is performed in an omnidirectional fashion, which alleviates the burden of beam alignment. Beamforming or other directional transmissions can be performed after initial link establishment. However, in mmW systems, the conventional IA procedure must provide a mechanism by which the BS and the UE determine suitable initial directions for transmission. This directional search significantly delays the link establishment, thus lowering throughput and reducing the spectral efficiency of mmW bands.

For mmW systems that rely on analog beamforming, three main approaches for IA have been discussed in the literature: Exhaustive search, hierarchical search, and context-information-based (CI-based) search.

Exhaustive search is a brute-force sequential beam searching technique. It is being proposed for 5G New Radio (NR), both at the BS and the UE. In the 5G IA, the BS sequentially transmits predefined signals along different directions for a certain duration to allow an undiscovered in-range UE to detect one or more of the transmitted beams. This exhaustive search comes at the cost of significant discovery time, as each transmit/receive pair must be probed in a sequential fashion.

On the other hand, hierarchical beam scanning, such as the one used in the IEEE 802.11ad standard for Wi-Fi-like access points (APs), employs a multi-resolution beamforming codebook to reduce the overhead of exhaustive sampling. Typically, a two-level hierarchy is used. In the first level, the AP sequentially transmits predefined signals over relatively wide (quasi-omnidirectional) sectors, and tries to determine the best of these coarse directions to reach a given device. In the second level (beam refinement), the AP refines its search within the best coarse sector by switching to narrower beams. Note that although this multi-resolution codebook reduces the IA delay, the search time still scales linearly with the total number of narrow beams.

Finally, the CI-based search relies on location information such as GPS. The UE simply selects the closest BS based on the GPS information, and steers its beam towards it.

Alternative IA approaches to the above have been proposed in the literature. For example, one suggested method includes periodically transmitting synchronization signals in random directions to scan the angular space. However, this approach has a relatively high probability of missing the best transmit/receive beam pair under analog beamforming. Another method uses a unique approach based on hashing functions to identify the best beam direction. Although the hash functions reduce the search time, the resulting beamforming gains are lower than that of a single beam, leading to a higher misdetection probability. In yet another approach, a beamforming scheme exploits the correlation between the sub-6 GHz and the mmW interfaces to provide efficient beam alignment. Although this scheme improves the performance, it requires a dedicated sub-6 GHz channel, which may not be feasible for all mmW systems. Finally, a model-driven beam-steering scheme called Oscan was previously proposed, which reduces the search latency by more than an order of magnitude. However, the OScan design is based on mmW channel measurements obtained using horn antennas. In reality, horn antennas have significantly different characteristics than phased-array antennas. Thus, their design would not fit in a system that uses phased-array antennas with strong sidelobes.

The aforementioned conventional techniques present different tradeoffs between discovery time and misdetection probability. As used herein, discovery time refers generally to the time to establish directional communication between two transceivers, such as the BS and the UE. The misdetection probability is the probability that a UE is not being detected by the BS. Referring again to the drawbacks of these conventional approaches, for example, in the first of its hierarchical levels, the 802.11ad scheme scans the space with wide sectors, and thus achieves a low discovery time. However, this technique also has a high chance of missing users due to low beamforming gains. During the 802.11ad scheme's beam refinement phase (level 2), the method attains better coverage and can even reach users located at the cell edge. However, the discovery time then becomes significantly higher.

Because the invention relates to beamforming using various antenna elements, including phased array antennas, the general principles of beamforming will now be described. For the sake of simplicity, this discussion will occur in the context of beamforming between a BS and a UE, although the same principles, and the inventive methods discussed below, can be extended to UE-UE beamforming in device-to-device (D2D) communications, whereby two UEs can communicate directly with each other, without needing a base station to relay their messages. Indeed, inventive embodiments can be extended to any distribution of transceivers, or transceiver elements, capable of forming beams.

FIG. 1 shows a block-level diagram of an arrangement 100 whereby a transceiver such as a UE 115 receives an incoming signal 110 along a directional receive beam. In the IA for 5G context, signal 110 would be produced by an unillustrated BS producing the directional signal with, for example, an electronically steerable phased-array antenna. UE 115 also includes a steerable antenna such as the illustrated steerable phased linear array antenna 120. Analog beamforming for both the BS and the UE 115 is assumed in the arrangement 100, although the discussion does not preclude the availability of digital beamforming. In the arrangement 100, the BS is the transmitter (Tx) and UE 115 is the receiver (Rx). For the sake of illustration, this discussion focuses on beamforming at the UE side (Rx), however, extension to the BS is straightforward. For the sake of simplicity, subscripts to denote BS and UE 115 are not used.

To electronically steer a beam in a phased-array antenna, complex weights are applied to each antenna element which may be implemented as shown by a set of phase shifters 130 which may also apply amplification in accordance with the complex weights before the antenna signals are summed at a combiner 140 and passed to an additional RF signal chain 150 of the UE 115. The RF chain 150 may include additional amplifiers, filters, and other signal processing functions. To determine the complex weights, the array factors (AFs) of the BS and the UE antenna arrays are first calculated. The AF is the factor by which the element factor of an individual antenna is multiplied to get the total firing pattern of the entire array. The following analysis starts with a uniform linear array (ULA), and is then extended to a uniform planar array (UPA).

Let N and F denote the number of antennas and the AF for the ULA case, respectively. Consider the ULA architecture shown in FIG. 1. The Rx receives a signal from a plane wave at an incident angle θ (relative to the plane of the array). Because the transmission paths are not equal, the received signal has different phase shifts at different antenna elements. Considering ULAs, adjacent elements are separated by the same distance d, leading to a linear array of total length (N−1)d. From FIG. 1, it can be seen that the phase of antenna element n leads the phase of element n−1 by $$\frac{2\pi}{\lambda}d\cos\theta,$$

where λ is the wavelength of the signal, because the path length to element n is d cos θ longer than that of n−1. Then, the received signal at antenna n, n∈{1, ..., N}, can be written as:

$$s_n = RI_n e^{jdn\frac{2\pi}{\lambda}\cos\theta}$$

where $I_n$ is the amplitude excitation of the nth element and R is the radiation pattern of each antenna element. In general, the radiation pattern of an antenna element conveys the angular dependence of the strength of the radiated signals. Here, each antenna is assumed to be an isotropic radiator, thus, R is constant across all angles. As $I_n$ does not have an effect on the analog beamforming weights, for simplicity, it is dropped out from further analysis (i.e., it is assumed $I_n$=1).

The output of a phased antenna array varies based on the angle of arrival (AoA) of the incident plane wave. In this manner, the phased antenna array acts as a spatial filter, selecting incoming signals based on their AoA. Let s be a weighted sum of $s_n$'s, with each term $s_n$ multiplied by a complex phase shifter weight $w_n$:

$$s = R\sum_{n=1}^{N} w_n e^{jdn\frac{2\pi}{\lambda}\cos\theta} = RF.$$

Assuming the same signal magnitude at each antenna, F can be maximized by selecting $w_n$ in a way to ensure that the received signals are in phase, i.e., by setting $$w_n = e^{-jdn\frac{2\pi}{\lambda}\cos\theta}.$$

In a ULA, this can be achieved by simply adding a progressive phase shift γ between elements. Specifically, the phase of the signal received by the Nth antenna is kept the same, and the phase of the signal received by every other antenna element n, n=1; ... ;N−1, is shifted by $$(N-n)\gamma = (N-n)\frac{2\pi d}{\lambda}\cos\theta.$$

This way, the UE beam can be steered away from the broadside of the planar array (which is when γ=0).

Generalizing the forgoing discussion to a 2-D planar antenna array, consider now a UPA having antenna elements 210 with a horizontal inter-element distance $d_x$ and a vertical inter-element distance $d_y$, and consider the receiver array architecture shown in FIG. 2, where the Rx receives a signal from azimuth angle θ and elevation angle α. As seen from FIG. 2, the antennas are placed on an M×N 2D grid.

Following a similar analysis to the one above, the received signal at antenna (m; n) $s_{m,n}$ is given by:

$$s_{m,n} = \text{Re}e^{j\frac{2\pi}{\lambda}(d_x m\cos\alpha\sin\theta + d_y n\sin\alpha\sin\theta)}$$

where m∈{1, ..., M} and n∈{1, ..., N}. Similarly, the received signal s after beamforming with complex phase-shift weights $w_{m,n}$ can be written as:

$$s = R\sum_{m=1}^{M}\sum_{n=1}^{N} w_{m,n} e^{j\frac{2\pi}{\lambda}(d_x m\cos\alpha\sin\theta + d_y n\sin\alpha\sin\theta)} = RF.$$

Similar to the ULA, complex beamforming weights can then be calculated as $$w_{m,n} = e^{-j\frac{2\pi}{\lambda}(d_x m\cos\alpha\sin\theta + d_y n\sin\alpha\sin\theta)}$$

Based on the above analysis, in FIG. 3 an example for a 3D beam pattern 300 is plotted, where the highest gain, zeroth order lobe is oriented at θ=45° and α=15°. Higher order sidelobes are also visible.

Recently, compressive sensing (CS) has gained great attention as a means to exploit the sparsity of mmW channels. CS is a signal processing technique that can be used to efficiently reconstruct a signal by solving an underdetermined set of linear equations. It is based on the principle that signal sparsity can be exploited to recover the signal using far fewer samples than required by the Shannon-Nyquist sampling theorem. This idea has been applied in mmW channel estimation, where it was used to design analog beamformers. Similarly, a CS-based approach has been described to estimate multipath channels (not necessarily mmW) that have a sparse representation, without imposing analog beamforming constraints. While these prior art approaches corroborate the significance of CS for channel estimation, they do not specify a practical way for collecting the required measurements. As another example, CS has been utilized in a multiuser MIMO system to design beamformers in a way that effectively mitigates inter-beam interference. Although this type of utilization and analysis is insightful, it does not consider the algorithmic perspective of IA.

SUMMARY

Embodiments of the invention obviate the shortcomings in conventional methods for IA (i.e., beam alignment between UE and a BS or more generally any two transceivers or arrays of transceivers) by providing a practical algorithm based on CS, which reduces the beam searching delay significantly while achieving a very low misdetection probability. Inventive embodiments provide such an algorithm, do not utilize any sub-6 GHz bands, and handle the beam search process completely in mmW bands. In addition, embodiments of the invention make use of phased-array antennas, which are present in mmW communications devices. Inventive methods are scalable to any radio system involving directional antennas and/or multiple, spaced-apart antenna elements where beam pointing is a concern.

The present disclosure describes beamforming methods between a BS and one or more UEs, and between multiple UEs. As used herein, the terms "user equipment" and "UE" can refer to wireless devices such as mobile telephones, personal digital assistants (PDAs), handheld or laptop computers, and similar devices or other User Agents ("UAs") that have telecommunications capabilities. A UE may refer to a mobile, or wireless device. The term "UE" may also refer to devices that have similar capabilities but that are not generally transportable, such as desktop computers, set-top boxes, or network nodes. As used herein, the phrase "base station" or BS may refer to any component, such as a traditional base station or a 5G base station that can provide a UE with access to other components in a telecommunications system, for example, with telecommunications access to a broader wired or wireless network, e.g., over a backhaul connection. It will be immediately clear to the person having skill in the art, however, that the methods described herein are applicable to many situations in which forming directional beams between a pair of transceivers is desirable.

Embodiments of the invention are directed to efficient IA methods referred to herein as "FastLink" for mmW systems. FastLink allows devices to transmit and receive using very narrow beams, providing the high beamforming gains. At the same time, the beam directions are switched in such a way that BS/UE beam alignment is achieved in much shorter time compared to other search mechanisms used in the 802.11ad standard and in conventional 5G systems. Methods disclosed herein identify the best transmit and receive beams in an efficient way, exploiting channel sparsity. This is accomplished by, first, using compressive sensing ("CS") to analyze the required number of measurements to find the "dominant" cluster. Then, using this insight, a binary-search-based algorithm, referred to herein as "3DPF", is used to find the best transmit-receive beam pair in 3D. 3DPF divides the set of beams into equally spaced subsets and then finds the beam that achieves the maximum received power in each subset. The number of subsets is a parameter determined using CS analysis.

Other embodiments of the invention are directed to a method of utilizing CS to obtain the optimal beam direction using a small number of measurements (beam probes), that is logarithmic in the total number of possible beams.

In one embodiment, the invention comprises a 3D beam scanning algorithm, 3DPF, which is based on beam subset partitioning and binary search, and which allows mmW devices to discover each other directionally, while keeping the discovery time and the UE misdetection probability low.

In another embodiment, the invention includes a new protocol for establishing IA using the beam steering methods discussed herein.

One embodiment is directed to a method of aligning an antenna beam to a source of signals. The antenna may be a directional antenna located on a UE and the source of signals may be a BS. The method includes dividing an angular search space into a plurality of angular search zones, measuring received signal strength within each angular search zone and, on the basis of the measurement, determining a direction of maximum received signal strength for each search zone, and comparing the maximum signal strengths for each of the search zones, and aligning the antenna beam along the direction of overall maximum signal strength.

Another embodiment is directed to a method of forming a beam between a cellular base station ("BS") having a directional antenna with a cellular user equipment ("UE") having a directional antenna. The method includes receiving a first directional signal from the base station, the received signal containing a BS beam id. The method also includes forming a directional receive beam at UE by dividing an angular search space into angular zones, such that the probability that each angular search zone contains a single peak in a function of received signal strength versus angle of arrival at the UE antenna exceeds a predetermined threshold. The UE also locates a receive beam within each angular search zone in the direction of peak received signal strength, and compares the beams with the highest received signal strength within each zone across zones to determine a receive beam having the highest overall received signal strength. Then, a beam is formed along the direction of having highest overall received signal strength.

Another embodiment is directed to a method of aligning an antenna beam of a first transceiver with an antenna beam of a second transceiver. At the first transceiver, a baseline beam is formed in a baseline direction and a signal is transmitted along the baseline beam. At the second transceiver, an angular search space is divided into angular zones, such that the probability that each angular search zone contains a single peak in a function of received signal strength versus angle of arrival at the UE antenna exceeds a predetermined threshold. Then, a receive beam is located within each angular search zone in the direction of peak received signal strength, the beams with the highest received signal strength within each zone across zones are compared to determine a receive beam having the highest overall received signal strength. At the second receiver, a reply message is transmitted along a transmit beam defined in the same direction as the receive beam having the highest overall received signal strength. At the first transceiver, the reply message is received along a receive beam defined in the baseline direction and a plurality of probe beams are formed surrounding the baseline direction. The received signal strength for the receive beam and the probe beams is measured, and a determination is made on the basis of the comparison a direction of rising receive signal strength. Then, at the first transceiver, a new baseline transmit beam is formed in the direction of rising receive signal strength.

Embodiments of the invention have demonstrated efficient establishment of IA using the 3DPF algorithm. The inventors have implemented the inventive method on hardware comprised of a mmW signal generator, vector signal analyzer, and 4×4 linear-polarized uniform planar arrays, being operated in the 29 GHz band. With proper selection of the design parameters, the 3DPF algorithm runs in logarithmic time, scanning only a small subset of all beams. The hardware implementation and simulation results indicate that the inventive methods described herein reduce the search time by more than 65% compared to 802.11ad-like beam search, and yet achieve the same misdetection probability. Additional advantages will become clear to the person having ordinary skill upon consideration of the following detailed description of the preferred embodiments.

BRIEF DESCRIPTION OF THE DRAWINGS

The following disclosure will be better understood in reference to the following accompanying generally not-to-scale Drawings, of which.

Figure 1:
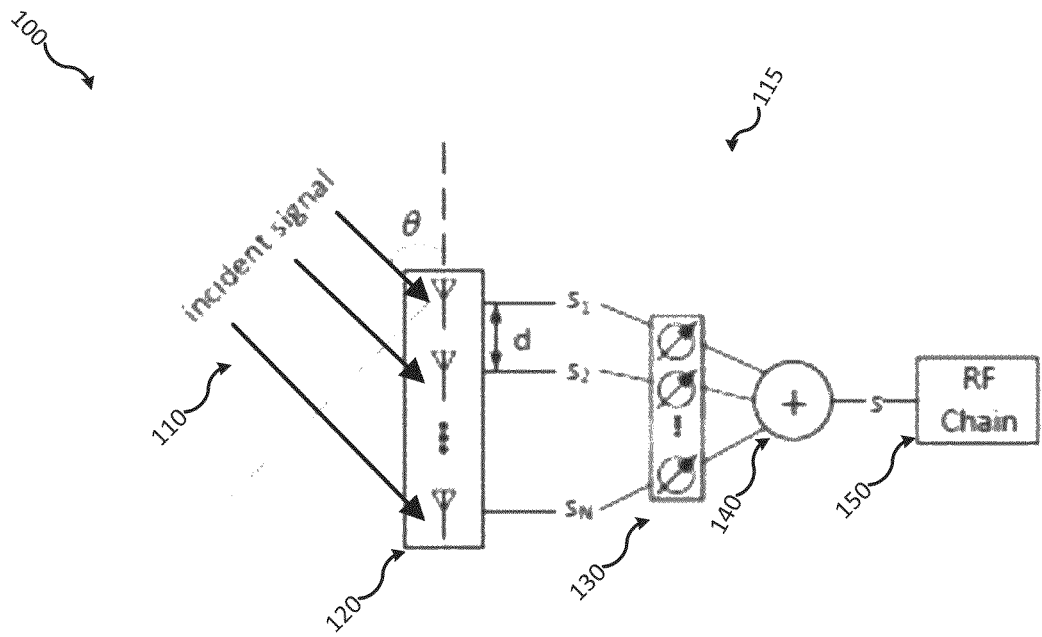
FIG. 1 is visualization of analog Rx beamforming with a uniform linear array (ULA) where the angle of the desired Rx direction is $\theta$.
Figure 2:
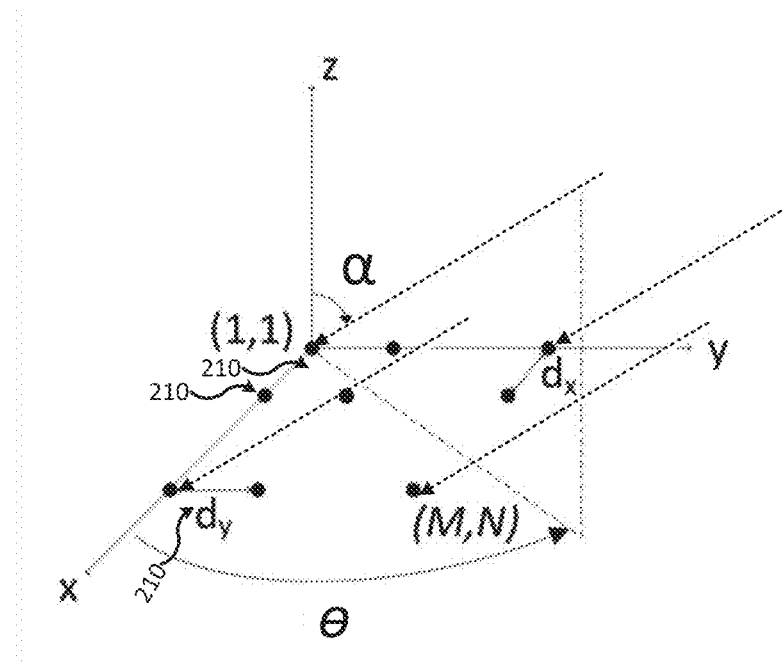
FIG. 2 is visualization of analog Rx beamforming on a uniform planar array (UPA) where the angle of the desired Rx direction is $(\theta; \alpha)$.
Figure 3:
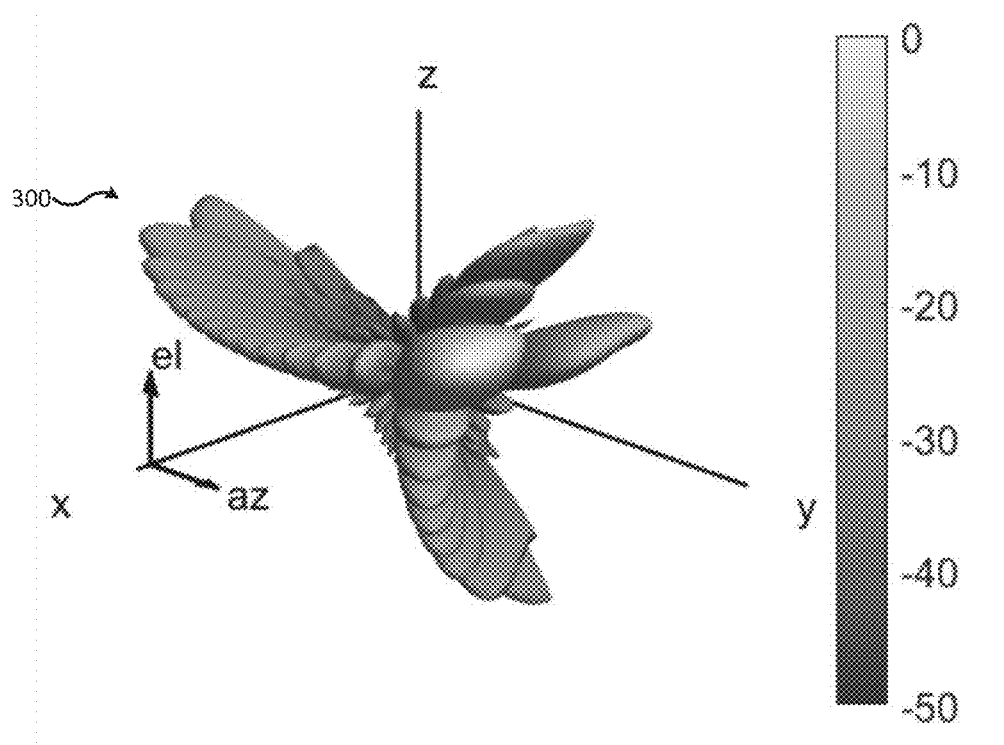
FIG. 3 is a normalized 3D directivity pattern of a 16×16 uniform planar array (UPA), when azimuth and elevation angles are 45° and 15° from broadside, respectively (antennas placed on the Y-Z plane).

Generally, the sizes and relative scales of elements in Figures may be set to be different from actual ones to appropriately facilitate simplicity, clarity, and understanding of the Figures. For the same reason, not all elements present in one Figure may necessarily be shown in another.

DETAILED DESCRIPTION

In accordance with examples of embodiments of the present invention, methods and apparatus are disclosed for providing fast beam scanning and device discovery in wireless systems operating on upper centimeter (cmW) or mmW bands, while improving upon the search delay and misdetection probability present in conventional solutions.

Because of their wavelength, RF transmissions in mmW bands exhibit low scattering and high absorption through certain media. This results in limited multi-path channels between the UE and a BS, because of the few reflections. Inventive embodiments make advantageous use of this property. The lack of reflections means that the channel matrix between the BS and the UE is sparse. More specifically, a transmitted signal reaches the Rx along only a few AoA clusters, depending on the environment (see, for example, the received power profile in FIG. 4, discussed more fully below). (A cluster may be thought of as is a collection of paths between a transmitter and a receiver, whose angle-of-arrivals (AoA), angle-of-departures (AoD), and path gains are quite close to each other.) This means that a system of linear equations representing available spatial channels between a Tx and Rx, when expressed as a matrix, will have zeros occupying most of the matrix. Compressive sensing dictates that such a sparse channel matrix is capable of being captured and represented through sampling at a rate significantly below the Nyquist rate. Considering the limited scattering nature of the mmW channel, inventive methods formulate the channel estimation problem as a sparse problem, and then apply CS-consistent sampling to find the optimal beam direction, with a certainty that is user-adjustable and/or predetermined. An exemplary method by which this can be accomplished will now be discussed.

First, the channel between a BS and a UE is expressed under UPAs. To denote a vector or a matrix with x rows and y columns, the notation x×y is used. Let the total number of antennas for the BS and the UE be $A_{BS}=N_{BS} \times M_{BS}$ and $A_{UE}=N_{UE} \times M_{UE}$, respectively, where $M_i(N_i)$, $i \in$ 'BS', 'UE' refers to the number of rows (columns) of the UPAs. Let $a_B(\theta', \alpha')$ denote the $A_{BS} \times 1$ array response vector (ARV) of the BS antenna system and $a_U(\theta, \alpha)$ denote the $A_{UE} \times 1$ ARV of the UE antenna system. Here, $(\theta_p, \alpha_p)$ and $(\theta'_p, \alpha'_p)$ are the AoA and angle-of-departure (AoD) for cluster p at the time of reception or transmission, respectively. Then, the $A_{UE} \times A_{BS}$ channel matrix H between the BS and the UE can be expressed as:

$$H = \sum_{p=1}^{P} h_p a_{ij}(\theta_p, \alpha_p) a_B^*(\theta'_p, \alpha'_p)$$

where $(.)^*$ denotes conjugate transpose operation, P is the number of clusters, $h_p$ is the gain of the pth cluster (a complex number), $(\theta'_p, \alpha'_p)$ is the AoD at the BS, and $(\theta_p, \alpha_p)$ is the AoA at the UE for the pth path. Note that due to the limited scattering in the mmW channel, P is relatively small.

To express the received signal, BS and UE beamforming is applied to a given channel H. Generally, a set of transmit and receive beamforming vectors for desired directions, relative to some physical axis defined at the Rx and Tx, $f_i \in \mathbb{C}^{A_{BS} \times 1}$, is computed offline and stored in codebooks $q_j \in \mathbb{C}^{A_{UE} \times 1}$ at the Tx and the Rx. At any time during IA, the BS would be using a transmit beamforming vector and UE would be using a receive beamforming vector (i and j are the indices of the beamforming vectors in their codebooks). The received signal, $y_{ij}$, can be represented as:

$$y_{ij} = q_j^* H f_i s + q_j^* n$$

where s is the transmitted signal, $n \in \mathbb{C}^{A_{UE} \times 1}$ is a matrix whose entries are complex circularly-symmetric white Gaussian noise. Note that a given Tx beamformer $f_i$ (also, a given Rx beamformer $q_i$) specifies the values for the angles $\alpha$ and $\theta$ of the Tx (also, Rx) antenna weight $w_{m,n}$. Let $\mathbb{Q} = \{q_1, q_2, \ldots, q_D\}$ denote the codebook of the Rx beamformer, where D is the maximum number of narrow beams that can be generated at the Rx. This D is a function of the resolution of the phase shifters.

To find the optimal Rx beamformer for a given Tx beamformer, we define the precoded channel vector $g_i \triangleq H f_i$, where $g_i \in \mathbb{C}^{A_{UE} \times 1}$. Then, $q_j^* g_i$ corresponds to measuring $g_i$ with the Rx beam j. Using the codebook $\mathbb{Q}$, we can form a basis matrix Q whose jth row is given by $q_j^*$, $j=1, \ldots, D$. Then, D measurements for D different Rx beamformers and a given precoded channel $g_i$ can be collected as:

$$v = Q g_i$$

where v is a vector of length D, containing the channel measurement results. The aim here is to reconstruct v by taking only r measurements from $g_m$ such that r<D, and find the beam IDs of these r measurements. As has been shown above, the channel has P clusters, meaning that v is P-sparse, i.e., it displays P peak values. In general, the notion of P-sparsity is used for vectors with at most P nonzero entries. However, as has been shown, compressive sensing can be used to reconstruct noisy vectors with P peaks. Therefore, for convenience, vectors exhibiting P peaks are referred to as P-sparse. Hence, v can be constructed provided that r≥P. Define Φ as an r×D compressed measurement matrix. Then, output Ψ of the compressed measurement process can be represented as: $\Psi = \Phi v = \Phi Q g_i = \Phi g_i = \Theta g_i$ where Θ is an r×$A_{UE}$ matrix and Ψ is a column vector of length r. The problem is then reduced to designing a stable measurement matrix Φ such that the key information in any P-sparse or compressible signal is not lost through the dimensionality reduction. In other words, v is reconstructed by using the available measurement results Ψ and the known compressed measurement matrix Φ. A necessary and sufficient condition to find a solution to the problem for the P-sparse v is the restricted isometry property (RIP), which is satisfied by a given matrix Θ if $$(1 - \epsilon) \leq \frac{\|\Theta z\|_2^2}{\|z\|_2^2} \leq (1 + \epsilon)$$

holds for any arbitrary P-sparse z and for some isometry constant $\epsilon > 0$. Specifically, the matrix Θ must preserve the length of an arbitrary P-sparse z. A related condition, referred to as incoherence, requires that the rows of Φ to not sparsely represent the columns of Q. Both the RIP and incoherence can be achieved with high probability simply by selecting Φ as a random matrix. Specifically, when the entries of Φ are drawn independently from a random Gaussian distribution N(0, 1/r) of mean zero and variance 1/r, Φ can satisfy RIP and incoherence with high probability if $$r \geq cP \log \frac{D}{P}$$

where c is a small constant that depends on the desired probability of success. This result is given by the following theorem:

Theorem 1. Let $$r \geq cP\log\frac{D}{P}$$

and construct $\Phi$ by drawing its entries independently from a normal distribution $N(0, 1/r)$. Then, with probability greater than $(1-e^{-cr})$, it is possible to reconstruct every P-sparse signal v of length D using $\Psi$. Proof of this theorem may be found in R. Baraniuk, M. Davenport, R. DeVore, and M. Wakin, "A simple proof of the restricted isometry property for random matrices," Constructive Approximation, vol. 28, no. 3, pp. 253-263, 2008, which is incorporated herein by reference in its entirety.

Thus, the P-sparse v can be recovered from only $r \geq cP \log(D/P)$ random measurements. Generally, $\Phi$ is constructed iteratively by adding a new random row to it at each iteration. However, a measurement matrix $\Phi$ constructed with random phase shifts will have low beamforming gains, which will likely not satisfy the link budget. On the other hand, by selecting the columns of $\Phi$ from the codebook $\mathcal{Q}$, the beamforming gains can be increased for a specified set of directions. This corresponds to constructing $\Phi$ as a row selection matrix, which consists of a single 1 at each row (total of r rows) and each column (total of D columns). The remaining entries of the matrix consist of 0s and the column indices of 1s indicate the rows to be selected from $\mathcal{Q}^*$. This is possible, given that different UE beamformers are spatially orthogonal. When $\Phi$ is constructed based on a subset of measurement vectors that are selected from an orthogonal basis ($\mathcal{Q}$), RIP is still satisfied, assuming sufficient beam separation.

With this approach, $\Phi$ can be constructed such that at each iteration, a new row is selected from $\mathcal{Q}$ with the goal of reducing the uncertainty of the estimated v. In step n, this is equivalent to selecting a row that maximizes the variance of the measurement result $\Psi_n$, where $\Psi_n$ denotes the nth element of $\Psi$. In other words, the new row $q_i^*$ should be selected to constitute the measurement for which the data is most uncertain.

Using the above insights, three methods that aim at determining the best beam directions for the BS and the UE under different assumptions are described. The methods collect $cP\log(D/P)$ measurements in an intelligent way, so as to ensure a low misdetection probability. Because nearby beams give correlated results (and cannot maximize the variance of a new measurement), in certain iterations, the algorithms probe a beam that points at a significantly different angle. These methods allow devices to discover each other directionally. For the simplicity of exposition, two methods for 2D beam search are disclosed. Those methods are then expanded and described for 3D scanning.

Single-Peak Finding (SPF) Algorithm

Methods according to inventive embodiments efficiently locate the Rx beam j that yields the largest $|q_j^* g_i|^2$ (i.e, the largest gain for a given channel, e.g., a precoded derived from a codebook). Thus, the Rx beam j that yields the largest $|q_j^* g_i|^2$ (i.e, the largest gain for a given precoded channel) is what is located according to inventive search methods. For a first case, it is assumed that the transmitter beam is Tx is first pointing towards a fixed, arbitrarily chosen direction using its beam i and beamformer $f_i$, and the receiver, Rx tries to find the optimal beam with respect to the given Tx direction. Extension to finding the optimal direction in the Tx side will be explained below. While pointing in a given direction i, the Tx sends some synchronization signal ("SS"). In the case where the TX is a 5G BS negotiating IA, the SS contains the BS's cell and beam IDs—an arrangement that is described in additional detail below. According to the basic method, the Rx measures the received power and steers its receive beam in accordance with its measurement to maximize SNR or received power. For brevity, in this section, the subscript i from $g_i$ is omitted. Additionally, for the purposes of this discussion, a fixed elevation angle for both Tx and Rx beams is assumed, and the method focuses on finding the best azimuth angle (2D case) for the Rx.

As is set forth above, the transmitted signals over mmW channels arrive in clusters of distinct angular directions. Accordingly, a typical plot of the relationship between Rx beam direction (i.e., beam ID) vs. SNR will contain multiple peaks due to this channel clustering phenomenon. For this reason, the distribution of attainable gain or SNR can be thought of as a function that varies according to Rx beam angle, as well as Rx beam shape. Beam shape as a variable, however, according to methods set forth herein, is held constant by using predetermined array antenna vectors, e.g., antenna beam definition vectors stored in a UE codebook, to determine beam shape. The analysis set forth above demonstrates that such a function can be determined by random sampling at below the Nyquist rate. Inventive methods like the one described here employ one such sub-Nyquist sampling methodology.

Figure 4:
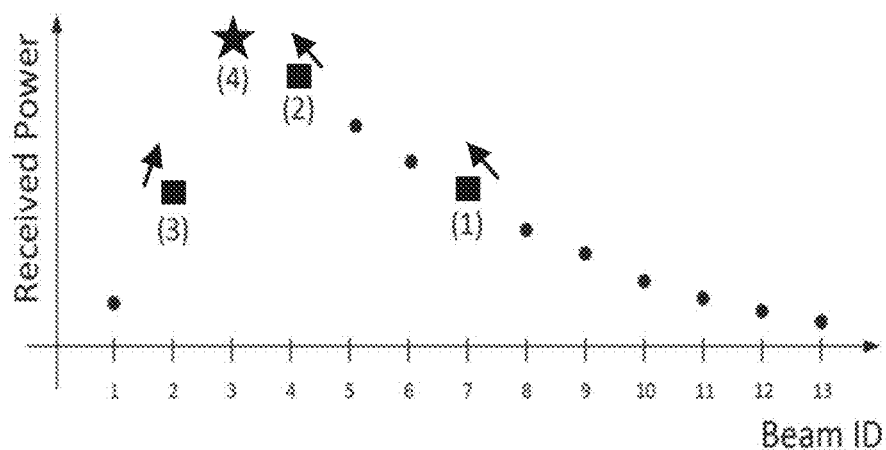
FIG. 4 is a graphical representation of the received power of various RF beams in an example scenario, which depicts aspects of a peak-finding algorithm according to certain embodiments.

In this 2-D case, it is assumed that that there is a single peak in the received Tx cluster. This is depicted in FIG. 4, which is a plot of received power (i.e., SNR) v. Rx beam direction quantized by Rx beam ID, which may determined, for example, from an Rx codebook. The graph of FIG. 4 contains a single peak at the direction of Rx beam ID #3. One way to perfectly reconstruct the Power v. AoA space depicted in FIG. 4 would be to probe by angle at or above the Nyquist frequency. Using the Rx codebook would limit the available angular samples to directions present in the codebook, and so the best, most exhaustive search that could be done under this limitation would be to sample every direction available in the codebook, Q. Thus, the graph in FIG. 4 cannot be perfectly reconstructed without measuring the SNR for each Rx beam. However, the compressive sensing analysis set forth above has revealed that such exhaustive sampling is not required for these signals, and so, exploiting this analysis, this inventive method takes r measurements (r<D) such that the optimal Rx beamformer for a given Tx beamformer can be found with high probability, in accordance with Theorem 1, above.

For the single-peak scenario under discussion, inventive embodiments employ what will be called "the SPF algorithm", which can be summarized as follows. First, the precoded channel g is measured using an Rx beamformer $q_i$ that generates a starting beam i in the middle of the Rx field-of-view (FoV). The Rx field of view may be predefined, for example, if there is some a priori knowledge about the rough direction of the Tx, or it may be chosen to be a central direction available in the codebook Q. From $q_i$, the measurement results in $v_i = q_i^* g$. Then, i's left and right adjacent beams in the azimuth domain, i−1 and i+1, are scanned and $v_{i+1} = q_{i+1}^* g$ and $v_{i-1} = q_{i-}^* g$ are obtained, respectively. If $|v_i|^2 > |v_{i-1}|^2$ and $|v_i|^2 > |v_{i+1}|^2$ where $|\cdot|$ indicates the modulus of a complex number, then $v_i$ is the peak. Otherwise, v is "rising" towards the left or the right of beam i. Thus, the directions $\mathcal{Q}'$ that v is no longer rising towards need not to be scanned. If both directions are rising the direction of steepest ascent is selected. This leaves the subset of the codebook, where $\mathcal{Q}'=\mathcal{Q}\{1, \ldots, i-1\}$ or $\mathcal{Q}'=\mathcal{Q}\{i+1, \ldots, D\}$, eliminating the need to probe the directions in $\mathcal{Q}/\{\mathcal{Q}'\cup\{i\}\}$. The next probe beam is then selected to fall in the middle of the reduced portion of the codebook $\mathcal{Q}'$, and the procedure is repeated for the remaining directions until the peak is reached (see Algorithm 1, below). An example is illustrated in FIG. 4, where the numbers below the dots represent the order by which the beams are scanned.

---

Algorithm 1 Single-peak Finding Algorithm

---

1: procedure SINGLE_PEAK ($\mathcal{Q}$, g)
2: Initialize:
3:    i ← D/2
4:    $\upsilon_i \leftarrow q_i^*g, \upsilon_{i-1} \leftarrow q_{i-1}^*g, u_{i+1} \leftarrow q_{i+1}^*g$
5: Recursion:
6:    if $|\upsilon_i|^2 > |\upsilon_{i-1}|^2$ and $|\upsilon_i|^2 > |\upsilon_{i+1}|^2$ then
7:      return $|\upsilon_i|^2$
8:    else
9:      if $|\upsilon_{i+1}|^2 - |\upsilon_i|^2 > |\upsilon_{i-1}|^2 - |\upsilon_i|^2$ then
10:        return SINGLE_PEAK($\mathcal{Q}\{i + 1 : D\}$, g)
11:      else
12:        return SINGLE_PEAK($\mathcal{Q}\{1 : i - 1\}$, g)

---

Specifically, FIG. 4 shows 13 beams identified by the integers 1-13. In this example the beams 1-13 are ordered according to position along a measurement axis (e.g., an azimuth dimension in polar coordinates). According to the SPF algorithm, the central beam is measured first (beam ID 7) as well as the two adjacent beams (beam IDs 6 and 8). Because the signal is ascending in the direction of beam ID 6, the right hand side of the codebook (corresponding to everything to the right of beam ID 7, is discarded. Then midpoint of the remainder of the codebook is selected, which is beam ID 4 (this being an approximate midpoint because there are an even numbers of beams in the selected range). Neighboring probe beams are then measured, which discovers a rise toward beam ID 3, so again, the codebook to the right of beam ID 4 is discarded, and a new midpoint is probed at beam ID 2, and the neighboring probe beams indicate rising signal toward beam ID 3. Because the signal level increases monotonically moving from beam ID 1 toward beam ID 3 and because they no unmeasured points remain to the right of beam ID 2, beam ID 4 is identified as the local maximum (identified by a star). In some embodiments, the middle beam may be chosen randomly, or using any other suitable method, between two middle beams when the total number of beams is even.

Generally, If v exhibits a single peak, the SPF algorithm finds its largest element in O(log D) time. However, in case v has multiple peaks, SPF finds only one of the peaks, and not necessarily the optimal or global maximum. For a realistic mmW channel, v can have several peaks, possibly with different values. To cope with that, this disclosure provides an alternative embodiment, where the method just discussed is extended to a method that will be referred to as multiple-peak finding ("MPF" or "the MPF algorithm"). The MPF method finds the highest peak, or alternatively, a peak where the channel gain exceeds some predetermined threshold that that can support the link budget (i.e., an SNR value above a certain threshold.

Multiple-Peak Finding (MPF) Algorithm

To reduce the chances of getting stuck at a local maxima, in the MPF algorithm, the codebook $\mathcal{Q}$ is divided into K equal-sized subsets, each representing an angular region. In this embodiment, K is selected in a way that each region is likely to contain at most one peak. Then, within each region, SPF algorithm is performed. Finally, the local maxima that are found within each angular region K are compared, and the largest among them is selected for communication.

The MPF algorithm is summarized in Algorithm 2 below. Its complexity is $$O\left(K\log\frac{D}{K}\right),$$

given that the SPF algorithm is run in K regions, each of size $$\frac{D}{K}.$$

Clearly, as K approaches D, the MPF algorithm converges to an exhaustive search using all defined codebook beams, and the complexity approaches O(D). However, if K is chosen to be very small (e.g., 1), the complexity of the algorithm would be O(log D), but there is a high chance that the global maxima will be missed. In inventive embodiments, if the local maxima that the algorithm returns cannot support the link budget, a misdetection is declared; otherwise the beam is declared "sub-optimal" but communications along that beam can still be established. By choosing a proper K, however, inventive embodiments ensure a high probability of having at most one peak in each angular region, which the algorithm is guaranteed to find, while at the same time reducing the total number of measurements required.

---

Algorithm 2 Multi-peak Finding Algorithm

---

1: procedure MULTI_PEAK($\mathcal{Q}$, g, K)
2: Divide Regions:
3:    Divide $\mathcal{Q}$ into K equal regions $R_i$
4: Finding Peaks:
5:    Candidates $\Omega \leftarrow \{\ \}$
6:    for Each $R_i$, i ∈ {1,...K} do
7:      localMax ← SINGLE_PEAK($R_i$, g)
8:      $\Omega \leftarrow \Omega \cup$ localMax
    return max($\Omega$)

---

Figure 5:
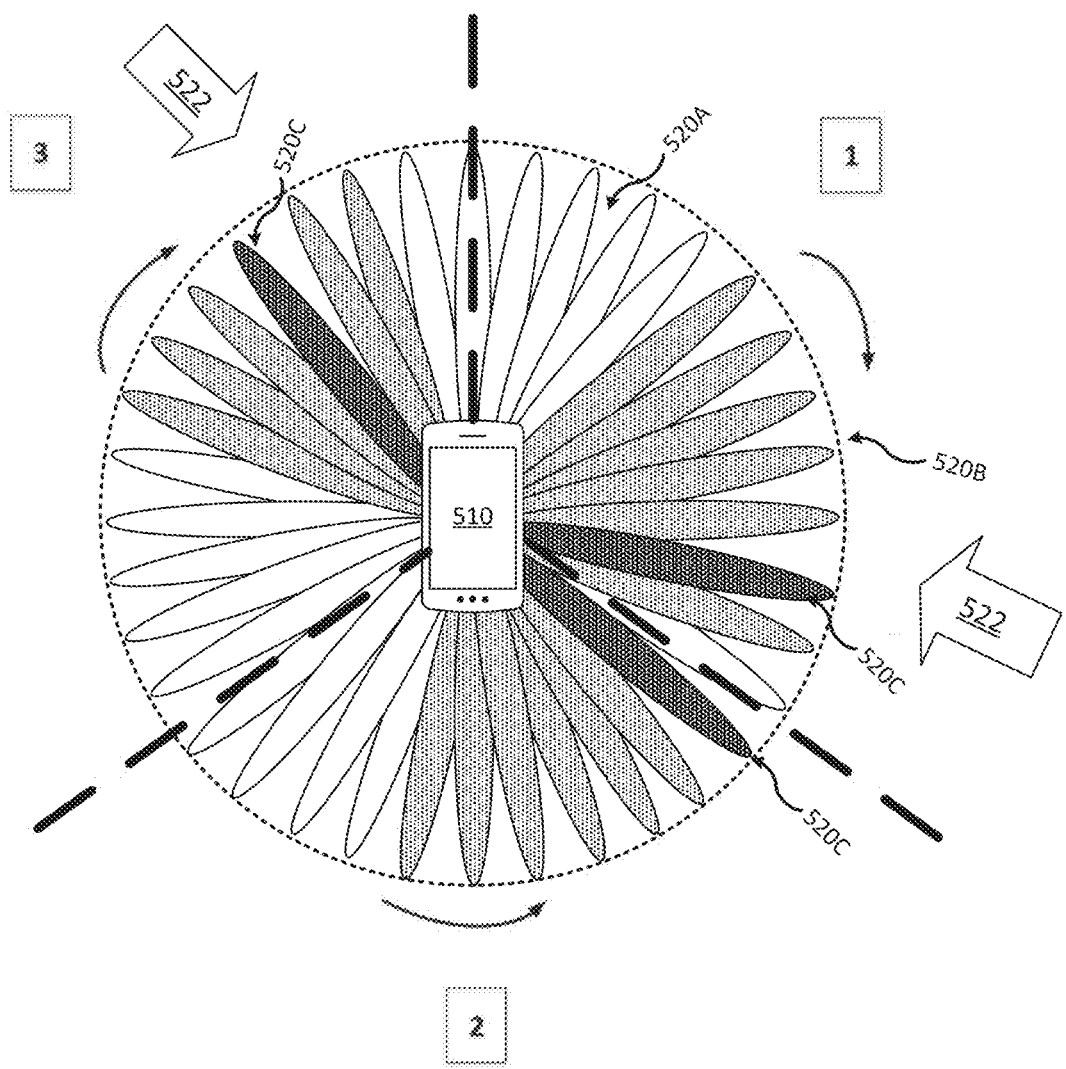
FIG. 5 is a visualization of an example of executing a multiple-peak finding algorithm according to certain embodiments.

An example of the MPF algorithm used by a UE 510 is illustrated in FIG. 5. Here, the underlying channel has two clusters 522 in the directions indicated by straight arrows. K is selected as 3. The boundaries of the K regions are indicated with dashed lines, dividing the whole codebook into three sets (numbered clockwise). The UE 510 runs SPF for each region, first taking measurements from the middle beams in each region and their neighbors, i.e., the UE measures $|v_i|^2$, $|v_j|^2$. Beams 520, which are scanned during this example (i.e., beams 520B, 520C) are shaded in FIG. 5, while beams which are not measured are unshaded (beams 520A). Using these measurements, the UE 510 determines the rising directions, eliminating approximately half of the beams in each region or more. Then, it scans through several more beams 520B, until reaching the beams 520C indicated by the darkest shading. The beams 502C yield the highest measurement results within their regions, making them the three candidates for the optimal beam. Finally, the algorithm compares the three measurement results and selects the beamformer corresponding to the highest result ($q_i$, $q_j$ or $q_k$).

3DPF Algorithm

In this section, the previously described beam steering methodologies are extended to a 3D beam search. As previously explained in the 2D case, when a beam direction i is probed, two adjacent beams in the azimuth domain i−1 and i+1 are also probed: one on the left and one on the right of beam i. In the 3D case, when time beam direction i is probed, four adjacent beams are also probed: up and down in the elevation domain, and left and right in the azimuth domain. The main difference between MPF and 3DPF is that when finding the rising directions in 3D, measurements are taken from these four neighbors of beam i and determine the rising quadrant (instead of the rising half of the array). Similar to the 2D case, once the rising quadrant is identified, the portions of the codebook within the selected angular zone are disgarded, and the algorithm is run recursively in selected quadrant. For a small number of total beams D, measuring four neighbors may incur a large overhead. However, when D is relatively large, that overhead is negligible, as demonstrated below.

Similar to MPF, in 3DPF, the space is divided into K angular regions to account for multiple peaks. Specifically, the horizontal domain is divided into $K_x$ and the vertical domain is divided into $K_y$ regions, where $K=K_xK_y$. As the algorithm still runs in logarithmic time within each region, the complexity is still $$O\left(K\log\frac{D}{K}\right).$$

The angular regions may be selected to cover, together, the entire field of view, or some predefined subset of the receiver's field of view.

The 3DPF is provided as a pseudocode in Algorithm 3, shown below. Above, q, f and v were denoted as vectors. When UPAs are used, these vectors are flattened matrices. For the sake of consistency in the notation, the vector notation is reused here. Note that when use $v_{i,up}$ refers to the measurement result obtained from i's upper neighboring beam in the elevation domain. Similar definitions apply to $v_{i,left}$, $v_{i,right}$, and $v_{i,down}$. The notation for $q_i$ is extended the same way to account for four different neighboring beam directions.

| Algorithm 3 3DPF Algorithm |
|---|
| 1: procedure 3D_SPF($\mathcal{Q}$, g) |
| 2: Initialize: |
| 3:    i ← middle beam of $\mathcal{Q}$ |
| 4:    $v_i \leftarrow q_i^* g$ |
| 5:    $v_{i,left} \leftarrow q_{i,left}^* g$, $v_{i,right} \leftarrow q_{i,right}^* g$ |
| 6:    $v_{i,up} \leftarrow q_{i,up}^* g$, $v_{i,down} \leftarrow q_{i,down}^* g$ |
| 7: Recursion: |
| 8:    if $\|v_i\|^2 > \|v_{i,up}\|^2$ and $\|v_i\|^2 > \|v_{i,down}\|^2$ and $\|v_i\|^2 > \|v_{i,left}\|^2$ and $\|v_i\|^2 > \|v_{i,right}\|^2$ then |
| 9:       return $\|v_i\|^2$ |
| 10:   else if $\|v_{i,down}\|^2 - \|v_i\|^2 < \|v_{i,up}\|^2 - \|v_i\|^2$ and $\|v_{i,left}\|^2 - \|v_i\|^2 < \|v_{i,right}\|^2 - \|v_i\|^2$ then |
| 11:       return 3D_SPF($\mathcal{Q}$ {upper-right quadrant}, g) |
| 12:   else if $\|v_{i,down}\|^2 - \|v_i\|^2 < \|v_{i,up}\|^2 - \|v_i\|^2$ and $\|v_{i,right}\|^2 - \|v_i\|^2 < \|v_{i,left}\|^2 - \|v_i\|^2$ then |
| 13:       return 3D_SPF($\mathcal{Q}$ {upper-left quadrant}, g) |
| 14:   else if $\|v_{i,up}\|^2 - \|v_i\|^2 < \|v_{i,down}\|^2 - \|v_i\|^2$ and $\|v_{i,left}\|^2 - \|v_i\|^2 < \|v_{i,right}\|^2 - \|v_i\|^2$ then |
| 15:       return 3D_SPF($\mathcal{Q}$ {upper-right quadrant}, g) |
| 16:   else |
| 17:       return 3D_SPF($\mathcal{Q}$ {upper-left quadrant}, g) |
| 18: procedure 3DPF($\mathcal{Q}$, g, $K_x$, $K_y$) |
| 19: Divide Regions: |
| 20:   Divide $\mathcal{Q}$ into K (K = $K_xK_y$) equal regions $R_i$ |
| 21: Findings Peaks: |
| 22:   Candidate $\Omega \leftarrow \{\ \}$ |
| 23:   for Each $R_i$, i ∈ {1,...K} do |
| 24:      localMax ← 3D_SPF($R_i$, g) |
| 25:      $\Omega \leftarrow \Omega \cup$ localMax |
|      return max($\Omega$) |

Selecting the Optimal Number of Regions

As discussed above, the peaks of the P-sparse measurement vector v can be found with high probability using $$r \geq cP\log\frac{D}{P}$$

samples, i.e, probed directions. Setting K=P in the 3DPF algorithm yields $$r = 5P\log\frac{D}{P}$$

samples including the neighbors of a selected beam. As a result, for r to be greater than or equal to cP log(D/P), c must be equal to 1. Using Theorem 1, it is proven that with K=P, the 3DPF algorithm achieves a misdetection probability less than $e^{-cr}=e^{-r}$. Accordingly, by setting K as the expected number of peaks in the arriving signal space, a very low misdetection probability obtains. Certain inventive methods set K using an estimate of P.

It is difficult to deterministically know in advance how many clusters a given environment exhibits at a specific operating frequency. Here, the inventive embodiments conservatively account for a relatively large number of clusters to lower the chances of misdetection. Let P* be defined as the 95th-percentile of the randomly distributed P. The distribution of P may be estimated as a function of frequency by max {Poisson($\mu$), 1}, where $\mu$=1.8, for the 28 GHz band. Solving numerically, P*≈3.72 when the operating frequency is 28 GHz. Methods of estimating the distribution of P are provided in IEEE Computer Society, "IEEE Standard-part 11: Wireless LAN medium access control (MAC) and physical layer (PHY) specifications amendment 3: Enhancements for very high throughput in the 60 GHz band (adoption of IEEE std 802.11ad-2012)," 2014 and M. R. Akdeniz, Y. Liu, M. K. Samimi, S. Sun, S. Rangan, T. S. Rappaport, and E. Erkip, "Millimeter wave channel modeling and cellular capacity evaluation," IEEE J. Sel. Areas Commun., vol. 32, no. 6, pp. 1164-1179, 2014, which are incorporated herein in their entirety.

Thus, in one embodiment, K is selected to be ⌈P*⌉, where ⌈·⌉ is the ceiling function. The inventors of the methods set forth herein have determined that for 2D beam searching, a conservative selection of K=4 achieves good performance result in terms of discovery time and misdetection probability. For 3D beam searching using 3DPF, the inventors evaluated several K values and determined that K=16 was found to achieve very low misdetection probability. These K values and the methods used to determine them are exemplary. Other values of K and other means of estimating P are acceptable and within the scope of the inventive embodiments.

FastLink Method

The inventive FastLink method for the IA process in mmW systems is now described, including an explanation on how it integrates the 3DPF algorithm as part of the message exchange both at the BS and the UE. Using inventive processes, the time to establish a connection between the BS and the UE, i.e. the discovery time, is significantly reduced. In addition, as explained before, Fast-Link is very reliable in the sense that the misdetection probability drops off exponentially fast with the number of measurements taken.

In LTE systems, IA and channel sounding are straightforward. The downlink (DL) channel quality is estimated from an omnidirectional signal called the Cell Reference Signal (CRS), which is regularly monitored by each UE to create a wideband channel estimate that can be used both for demodulating DL transmissions and for estimating the channel quality. However, in mmW 5G systems, IA must take place directionally. To find a suitable directional link, existing 5G specifications require that the BS covers the whole spatial area with a preconfigured number of beams, using periodically transmitted synchronization signal (SS) blocks. These SS blocks carry primary synchronization signals (PSS), secondary synchronization signals (SSS), and physical broadcast channel (PBCH) information. PSS is defined mainly for initial symbol boundary synchronization to the NR cell and the SSS is defined for detection of the cell and beam IDs. When the UE enters the coverage area of a BS, it listens to an SS burst (consisting of multiple SS blocks) and measures the signal quality (by means of SNR or received power) of different beams. It then determines the beam through which it experienced the maximum received power (above a predefined threshold). The corresponding beam will be chosen for subsequent transmissions and receptions, and the communication will benefit from the resulting antenna gain. After determining the best BS beam, the UE has to wait for the BS to schedule the random access channel (RACH) opportunity for the beam direction that the UE just determined. For each SS block, the BS will specify one or more RACH opportunities with a certain time, frequency offset, and direction, so that the UE knows when to transmit the RACH preamble. During the RACH opportunity, UE performs random access, implicitly informing the BS of its selected beam direction. Note that 5G specifications do not standardize how beam sweeping will be performed at the UE side.

In inventive methods, and unlike in conventional methods, beam sweeping is efficiently performed on the UE side. According to one inventive embodiment, the 3DPF algorithm is directly employed at the UE side, without changing the default IA operation of 5G explained above. This reduces the total search time in comparison with the conventional 5G IA procedure. In this embodiment, the BS sequentially transmits SS blocks along its predefined beam directions in accordance with its predefined sequence. For each BS transmission, the UE implements 3DPF (i.e., divides an angular search space into a predefined number of sectors, iteratively probes each sector to locate the sector peak, then compares all sector peaks to select the overall optimal peak), and defines an optimal beam corresponding to the received BS beam. This correspondence data is stored locally at the UE, or at a UE connected networked storage resource.

In certain embodiments, the stored record comprises: data sufficient to form and identify the best UE beam, data sufficient to identify the corresponding BS beam, and a measure of link quality using those UE and BS beams, e.g., a measure of received signal strength, SNR, or some other data indicating link quality. Additionally or alternatively, the UE compares the measure of link quality to a predetermined threshold, and stores an associated record reflecting the comparison. In these embodiments, the UE determines whether a given UE-BS beam pair, after optimization by 3DPF, can support the link budget. In the event that no signal is received (e.g., the UE cannot form a beam that receives the BS's signal a noise threshold), the UE stores data indicating a misdetection, and associates that data with the corresponding beam pair. In certain cases, the received signal may be above a minimal level of quality, e.g., a minimum SNR threshold required for demodulations, but the selected beam is not optimal in the sense that it does not yield the highest SNR. This may occur if the UE is able to form a beam that would support the link budget, but does not support a link quality that should be obtainable if the global peak was found by the UE. This situation might occur, when, for example, the UE misses a global maximum peak in one of the K angular sectors, and instead, converged to a local peak within that sector. Connection on such an acceptable, but suboptimal beam is also within the scope of the inventive embodiments.

After finding and tabulating the optimal receive beam for each of the BS's sequential beams, in one embodiment, the UE picks the beam that has the highest overall signal strength, and connects to the BS on that beam at the next connection opportunity.

While the calculation and storage steps set forth above are described as occurring by and at the UE, this is not a requirement. In certain embodiments, the UE transmits data to the BS for computation and storage of the recited parameters. In other embodiments, these steps are performed at remote (e.g., cloud based) storage facilities in networked communication with the UE. In certain embodiments, the BS communicates to the UE the identity of the best beam pair for the UE and BS.

Thus far, this disclosure has explained how the conventional IA method may be improved by implementing 3DPF at the UE. However, with some small changes in the IA structure, 3DPF can be employed both at the BS and the UE side, resulting in further efficiency gains. This eliminates the need for the BS to sweep its beams exhaustively, as in conventional methods. Instead, elements of 3DPF are performed iteratively, at both the UE and the BS, allowing the transceivers to converge to a good beam, while obviating the need for an exhaustive beam sweep by either transceiver. This Fastlink procedure allows beam finding to occur as the BS and the UE both sequentially scan through a small subset of their beam directions.

Figure 6A:
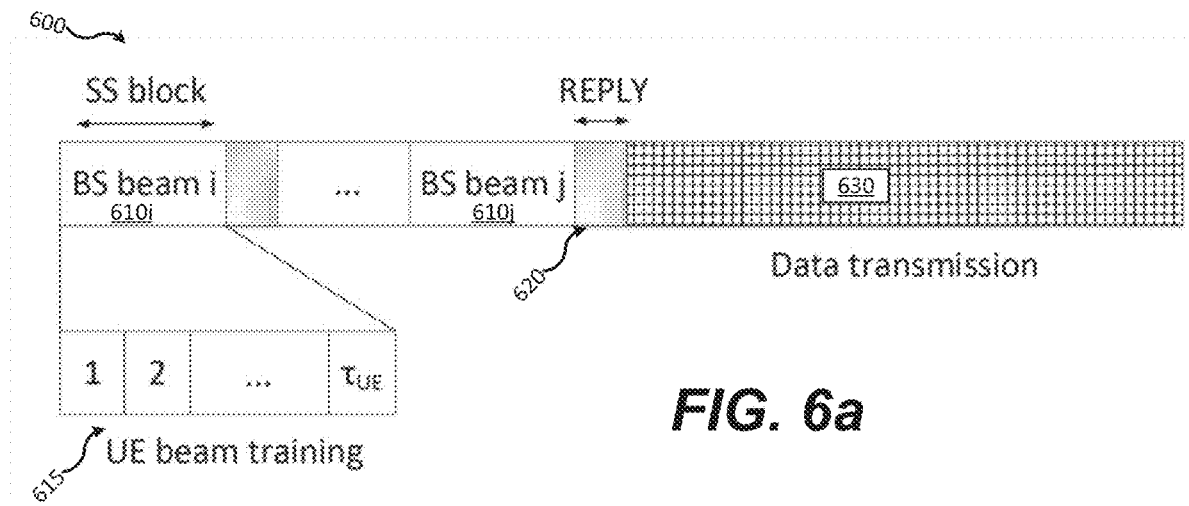
FIG. 6a is a representation of the proposed transmission block structure for a method of initial access according to certain embodiments.
Figure 6B:
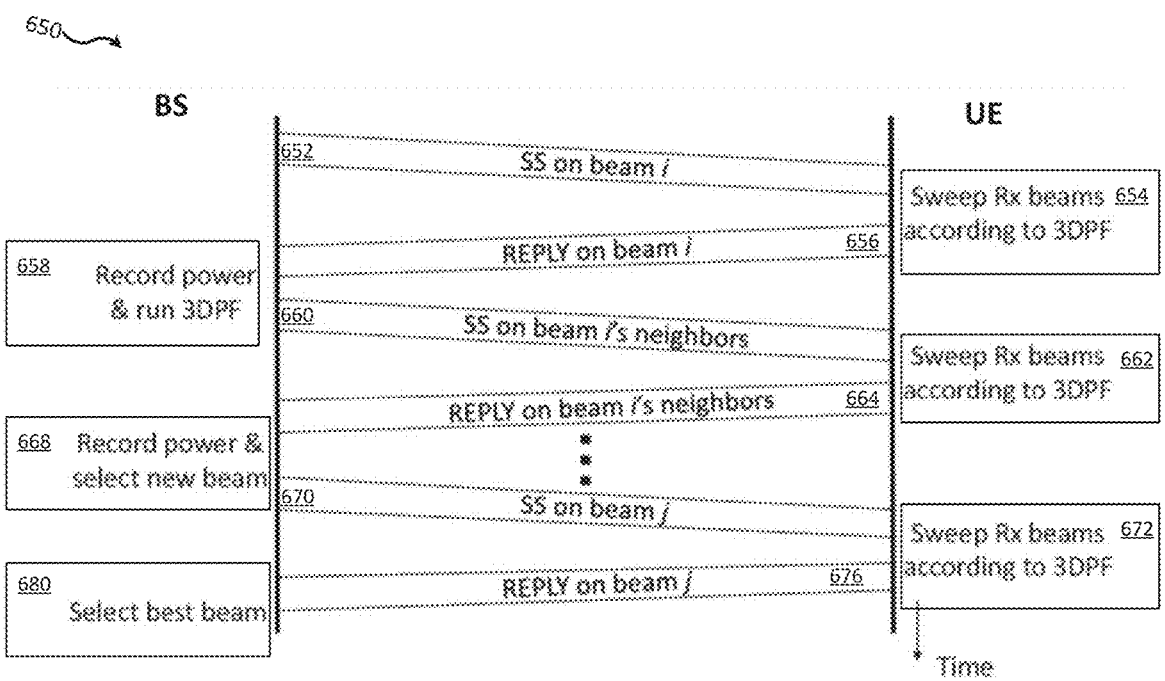
FIG. 6b is a representation of a proposed time sequence of communication between a base station and user equipment for initial access.

A diagram 600 of an exemplary transmission block structure for FastLink is shown in FIG. 6a and a timing sequence 650 is shown in FIG. 6b. As seen from FIG. 6a, the BS sends PSS and SSS for $\tau_{UE}$ consecutive mini-slots 615 within an SS block through a selected beam 610 (e.g., beam 610i), where $\tau_{UE}$ is the maximum required number of mini-slots for the UE to run the 3DPF algorithm with the preselected K. Specifically, $$\tau_{UE} = \lceil P^* \rceil \log \frac{D_{UE}}{\lceil P^* \rceil} \rightarrow$$

$$\tau_{UE} = 5\lceil P^* \rceil \log \frac{D_{UE}}{\lceil P^* \rceil},$$

and the same holds true for, $\tau_{BS}$, where $D_{UE}$ is the maximum number of narrow beams at the UE. For a time division duplex (TDD) system, because the BS and the UE operate on the same channel, the number of clusters they experience is the same. Thus, the optimal K (and the selected K under inventive methods) for the BS and the UE is the same, i.e. $K_{BS}=K_{UE}=\lceil P^* \rceil$, as discussed above. From this, the amount of time necessary to probe the angular space according to these methods can be calculated on the basis of a determined K, and as a result, the BS determines the length of time that that each SS block lasts (for UE to run 3DPF in the selected K sectors), without prior communication with the UE. In certain embodiments, the length of the SS block will be set at the UE to accommodate a reasonably high K value, e.g., 16, but this may be varied according to circumstances.

A mutual beam steering and optimization process is illustrated by the sequence 650 of FIG. 6b in which both a BS and UE use 3DPF. At step 652 a BS sends an SS block on a first beam (e.g, beam 610i of FIG. 6a), which may be an arbitrary beam defined by the BS codebook. It is contemplated that, in some embodiments, initial BS beam i will be an arbitrary beam formed by the BS as it runs its exhaustive beam sweeping program, as it does in conventional IA. At step 654, the UE detects the SS block transmitted on BS beam i, and employs 3DPF to determine the best receive beam for that BS beam, according to the same methods discussed above in reference to using 3DPF with conventional exhaustive BS beam sweeps. Specifically, the UE divides an angular search space into K sectors. Then, for each sector, the UE probes an initial probe direction within each sector (e.g., the middle of each sector) and forms pairs of mutually orthogonal probe beams to the central probe, e.g., with an adjacent pair in the azimuth plane, and an adjacent pair in the elevation plane. These beams are formed using predefined beams in the UE codebook. Then the UE compares received signal strength across these beams to determine a rising quadrant and/or a quadrant having the steepest rise relative to the central probe. Then the selects a new central probe in the rising quadrant, discarding the remaining portion of the codebook, and repeats the process until a beam having maximum signal strength within the angular sector is found. Then, the UE selects the beam (one of the K beams) that has the highest overall signal strength. This is the best UE beam for BS beam i.

The BS then switches to receive mode, and listens along beam i. Then, the UE sends a REPLY message along the direction of the best UE receive beam to the BS at step 656, and this REPLY message may be received by the BS. As in the embodiment discussed above, where the BS sweeps exhaustively, a data record is generated and stored reflecting the BS beam ID (e.g., i) and data reflecting a link quality associated with the connection along that beam (e.g., signal strength, SNR, etc.). This record may be generated by and stored at the UE, the BS, both, or some remote, networked connected data processing and storage facility (e.g., a computer connected to the BS over its backhaul network connection). The data reflecting a link quality can reflect signal strength as received by either the BS or the UE. The data record may also include the corresponding UE beam ID, but this is not a requirement. In a preferred embodiment, the BS stores a record reflecting the beam id of its receive beam (e.g., i), and the data reflecting link quality. Thus, at this point, if the BS has received the REPLY message, the BS knows that it is communicating with a UE along beam i, and it knows the signal quality achievable with the optimized UE beam along that BS beam.

In some cases, the power of the signal received by the BS can be lower than its sensitivity. If the BS does not receive a REPLY message from the UE after $T_{UE}$ mini-slots, it stores a minimum power value, $\zeta$, in a table located in local or networked storage for the first beam at step 658 and keeps executing the 3DPF method, selecting the next transmit beam suggested by the algorithm according to the obtained received power value. As a result, BS needs to scan at most $$\tau_{BS} = 5 \lceil P^* \rceil \log \frac{D_{BS}}{\lceil P^* \rceil}$$

beams, where $D_{BS}$ is the maximum number of narrow beams at the BS.

Next, the BS runs the 3DPF algorithm on the BS side, and as it generates probe beams, the UE, using 3DPF, generates its own reply beams in the optimal directions. In other words, the BS will divide a search space into K angular sectors, and will find the optimal beam within each sector by the iterative probing and binary search algorithm set forth above, and for each probe beam within each of the K sectors, the UE, itself using 3DPF, will reply along the optimal UE beam for that BS beam. It an embodiment, when the BS divides its search space into K sectors, that the initial beam along which it made contact with the UE (e.g., i), will be used to define the center of the first of the K search zones (Ki). The other zones will then be defined with respect to i or the angular boundaries of Ki. This, however, is not a requirement, as the distribution and orientation of the K search zones can be arbitrary, so long as they are coterminous along their edges.

At step 660 the BS sends the SS block over neighboring beams in the BS codebook, both in elevation and azimuth. These would be beams i+1, i−1, etc., but in two angular dimensions. Again using 3DPF, the UE identifies the best receive beam for transmissions on those neighboring BS transmit beams and replies along each of those beams at step 664. The BS then records the received power, and compares the received signal strength of the signal received on the neighboring beams to that received on original beam i, and as a result of this comparison, selects the rising (or most quickly rising) neighboring beam. The BS then selects a new beam, j, in the direction of improving signal strength. The new beam j may be defined in the direction that is halfway between i and the boundary of the search zone Ki in the direction of rising signal strength. At step 670 the BS transmits an SS block over the new beam (e.g., beam 610j of FIG. 6a). At step 672, the UE again performs 3DPF to identify the best receive beam for new transmit beam and replies at step 676, and the process repeats until the BS (and the UE) find a beam in which signal strength is no longer rising, which indicates that a peak has been located.

At step 680 the BS selects the best beam to communicate with the UE that it located in search zone Ki. The process is then repeated for the other K search zones. The procedure 650 may continue similarly with additional transmit beams when there are more than two available transmit beams.

After collecting all REPLY messages from the UE for the selected beams, the BS finally selects the best transmit beam from the table and the UE selects the best receive beam for the given transmit beam. This may require some communication between the BS and the UE, or the UE may automatically select the best beam on the basis of the ID of the beam selected by the BS. Using the inventive methods, the time required to establish the directional link can be reduced from $D_{BS}D_{UE}$ to $\tau_{BS}\tau_{UE}$ where $\tau_{BS} \ll D_{BS}$ and $\tau_{UE} \ll D_{UE}$. To account for the transmission delay of the REPLY messages, a variable $\delta$ is introduced. Therefore, the new time to establish a directional link using FastLink can be written as $\tau_{BS}\tau_{UE}+\delta\tau_{BS}=\tau_{BS}(\tau_{UE}+\delta)$. This $\delta$ accounts for the time required for the BS and UE hardware to switch from Rx to Tx mode, as well as the time spent over-the-air. Altogether, this time is typically less than 10 μs, and therefore, the feedback delay is rather small compared to the overall duration of the IA.

Thus far has been described a method whereby a BS in communication with a UE finds the best beams in each of K angular search sectors, where K has been chosen such that the number of gain peaks within each sector is equal to 1, above some predetermine probability. This is the equivalent of saying that the locates the UE and BS beams which are aligned along all of the peaks present, and the system may then choose the best of those beams for further communication (i.e., the globally best direction of alignment). However, this is not a requirement. In alternative embodiments, communication may be established along a beam alignment that is suboptimal, but still has a gain that exceeds some predetermined threshold, e.g., is capable of supporting the link budget.

Experimental And Analytical Verification

The IA beam alignment approach described herein has significant efficiency advantages over the conventional IEEE 802.11ad beam search approach, in which the search time scales linearly with D. Additionally, the beam search algorithm currently being considered for 5G NR also scales linearly with D, attaining similar efficiencies to the 802.11ad search. The inventors have verified the efficiency advantages of the inventive approach over conventional approaches, both by experiment and simulation. Those results will now be discussed.

The inventors conducted experiments to verify the efficiency of 3DPF. The Tx and Rx antennas used in the experiments were 4×4 UPAs with $d_x=0:5\lambda$ and $d_y=0:6\lambda$. The antenna gain at the boresight of the array was 12 dB. For the sake of measuring the received power, a waveform with 5 dBm amplitude and 29 GHz carrier frequency was transmitted (29 GHz is one of the candidate bands for 5G communications). To generate the waveform, an analog signal generator was used and its RF output was connected to the Tx antenna array. At the Rx side, the array was connected to a vector signal analyzer (VSA). To steer the transmit/receive beams along desired directions, the antenna arrays were connected to microcontrollers controlled by a PC via a serial port connection.

In testing the use of the inventive methods, a Tx beam (direction) was fixed and the best Rx direction for the given Tx direction was determined using both the 802.11ad beam scan methodology and the 3DPF algorithm, so that the results could be compared. With a Tx-Rx separation of 3 m, four scenarios were tested. First, a line-of-sight (LOS) scenario was considered where the Tx and Rx arrays are physically pointing towards each other. Second, a second LOS scenario was tested where the Tx physically points towards the Rx, but the Rx points towards a different horizontal and vertical point than the Tx. Third, a non-line-of-sight (NLOS) scenario was emulated, where the Tx points towards a reflector and the Tx and the Rx are on the same horizontal plane. Finally, a second NLOS scenario was tested, where the Tx was placed 0.3 m above the plane of the Rx but still pointing towards a reflector.

Figure 7:
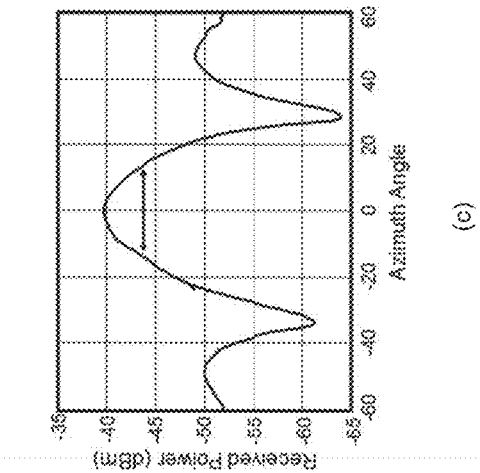
FIGS. 7(a)-(c) are graphical representations of Rx power as a function of angle-of-arrival for an experimental setup used to validate inventive methods.
Figure 7:
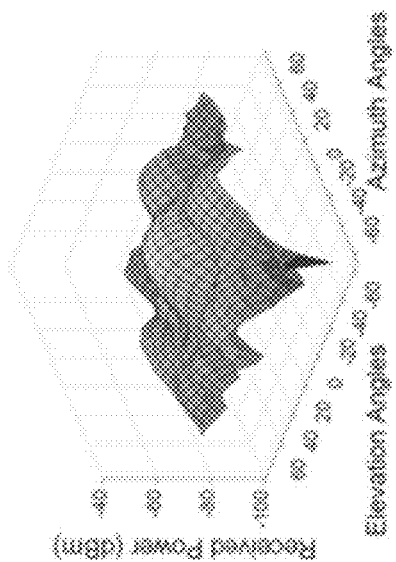
Figure 7:
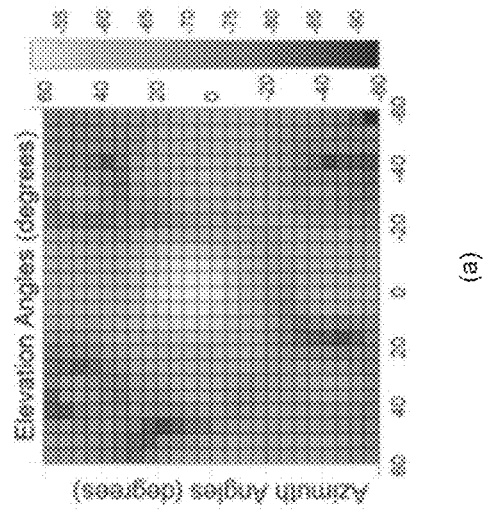

The effective beam scanning range of the antenna arrays used in the experiment described above are ±60° from broadside, in both azimuth and elevation. Beyond that, the antenna gain drops significantly as a result of the non-ideal behavior of the antenna elements. Therefore, this region can be considered as one quasi-omni beam for the sector-level scanning phase of 802.11ad. Thus, in the beam refinement phase, 802.11ad protocol exhaustively scans all narrow beams in this region. To experimentally obtain the AoA profile, the 3D space (within the effective beam scanning range of the antenna arrays) was scanned using 802.11ad beam scan approach for the different LOS scenarios. Using the setup described above, received signal strength (RSS) measurements were measured from the 3D space. The resulting plot for one of the Tx-Rx arrangements is shown in FIGS. 7(a) and 7(b), where the clustering effect of the mmW channel can be clearly seen. The azimuth cut of the antenna pattern was also observed, and is shown in FIG. 7(c). Using this, it was determined that the half-power beamwidth (HPBW) of the antenna was 26 (the HPBW is the point at which the received power decreases by 3 dB from its peak).

Figure 8:
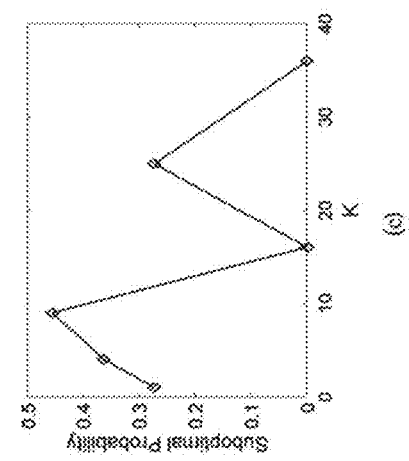
FIGS. 8(a)-(c) show experimental data reflecting comparisons between inventive beam alignment methods and conventional methods.
Figure 8:
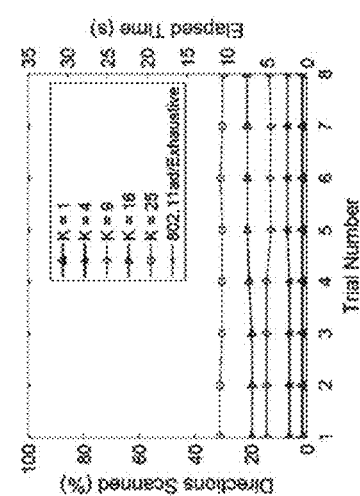
Figure 8:
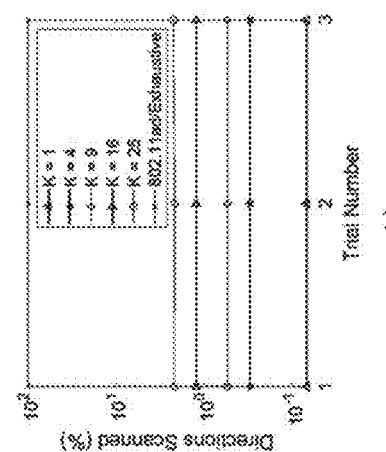

To evaluate the efficacy of the inventive methods, the inventors compared the 3DPF method with the exhaustive 802.11ad beam searching approach experimentally and plotted the percentage of the scanned beams and actual elapsed scan time. For 3DPF, several K values were used to study the resulting overhead time. The results are shown in FIG. 8. Note that even when K=25, the time required to find the best beam is still 70% less than that of 802.11ad.

In the scans of FIG. 8(a), a fine directional granularity of 1° is used, which results in D=14641. On the other hand, in FIG. 8(b), a coarser granularity of 5° is used, which results in D=625. Consequently, the scanning times in FIG. 8(a) are much larger than those in FIG. 8(b). Note that artificial delays are imposed while scanning, in order to read the Rx power values from the VSA through the serial port. For that reason, the timing values observed in the data of FIG. 8 are higher than that of a real system. Another important observation relates to the overhead of scanning neighboring beams in 3DPF. In FIG. 8(a), since the search space is very large, the overhead is negligible and 3DPF scans 1% of all the beams, on average. However, when the search space is smaller, the overhead is more dominant. Nevertheless, 3DPF still scans 2%-30% of the space, depending on the selected K.

As is set forth above, if the beam that the 3DPF method returns cannot support the link budget, a misdetection is declared; otherwise if the beam does not yield the highest Rx power but communications along that ban can still be established, the beam is declared "suboptimal". Due to short Tx-Rx distance in the experimental setup, no misdetections were observed in any of the experiments. However, the channel between the Tx and the Rx changed slightly between different runs. As a result, the optimal beam direction obtained with 802.11ad search approach may was observed to change within 5° in azimuth and elevation. It was assumed that these small changes (less than 5°) do not cause suboptimal beam selection. However, any change larger than 5° is called a suboptimal beam pair and the probability of finding a suboptimal beam is shown in FIG. 8(c) for different K values. Although 3DPF has a high suboptimal probability when values of K are small, this probability decreases significantly when K is greater than or equal to 9. Additionally, the suboptimal probability decays with increasing distance, as the misdetection probability becomes dominant.

Because of the physical distance limitations of the experimental setup, computer simulations were used to gauge the efficacy of 3DPF over increasing Tx-Rx distance. The following parameters were used in the simulations: Tx power $P_{tx}=30$ dBm, Rx sensitivity=−75 dBm, and $A_{BS}=A_{UE}=16$. In addition, we set $d_x=d_y=\lambda/2$ to avoid grating lobes. Results are averaged over 1000 runs. Simulations were run in the 28 GHz band and used to model the large-scale channel effects.

Figure 9:
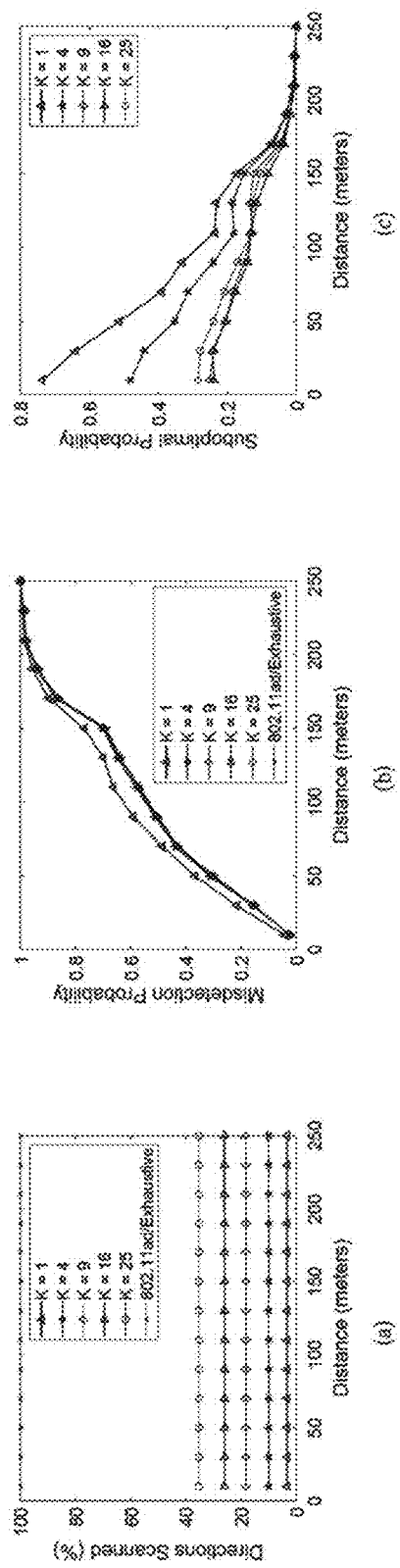
FIGS. 9(a)-(c) show simulation results reflecting comparisons between inventive beam alignment methods and conventional methods.

To introduce small-scale channel variations, random scatterers were placed on an ellipsoid between the Tx and the Rx. The Tx beam was kept the same, and the Rx swept its beam in 5° steps to find the best receive direction for the given Tx beam. Beam scanning range was kept the same as in the hardware experiments (±60° from broadside, in both azimuth and elevation). Tx-Rx separation was varied between 10 m and 250 m. An example simulation setup, and the placement of the scatterers can be seen in FIG. 10(a), and the resulting Rx powers for different Rx beam directions (when Tx points to a fixed direction) can be observed in FIGS. 10(b) and 10(c). The results from the simulations are in line with those obtained in the hardware experimental results. As is shown in FIG. 9(a), for all values of K, the number of scanned directions under 3DPF is significantly smaller than that of 802.11ad. Even when K=25, the number of scanned directions is reduced by more than 65%. In FIG. 9(b), the misdetection probability vs. the distance was observed. Except when K=1, the difference in the misdetection probability between 3DPF and 802.11ad is negligible. Finally, the probability of finding a suboptimal beam is plotted in 9(c) for different distance values. Although 3DPF has a high suboptimal probability when K=1 or K=4, the chances of finding a suboptimal beam is much lower when K≥9. This suggests that any K 10 or higher is a good choice for implementation with the inventive methods. Note that suboptimal probability decreases with increasing distance, simply because the misdetection probability becomes dominant when Tx-Rx separation is large.

Multi-User Performance

Figure 11:
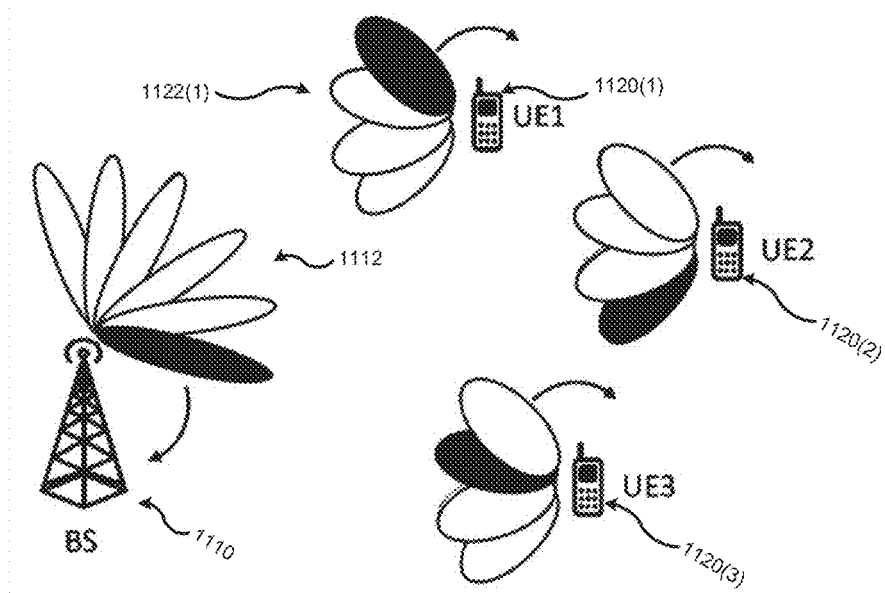
FIG. 11 is a graphical representation of multiple UEs which may select one of multiple beams to communicate with a BS which employs multiple beams.

While the disclosure above has focused on efficient methods for beam forming and beam alignment between two transceivers, e.g., a base station and a single UE, the invention is not limited to these scenarios. Indeed, the inventive methods are applicable and advantageous in circumstances where there are multiple UE transceivers contending for discovery by a single base station. FIG. 11 depicts such a scenario, where BS 1110 and mutiple UEs 1120 (i.e., UEs 1120(1), 1120(2), 1120(3)) are performing beam scanning to establish communication.

In conventional 5G IA, discovery time scales with $D_{BS}$-$D_{UE}$ regardless of the number of users present in the environment, as the parties perform an exhaustive beam sweep. Specifically, each UE 1120 sweeps through its set of beams 1122 (i.e., sets of beams {1122(1), 1122(2), 1122(3)}) for each BS beam 1112, and finds the BS beam through which it experienced the highest receive power. Then, the UE 1120 waits for the BS 1110 to schedule the RACH opportunity for the selected beam 1112. In the event that multiple users select the same BS beam 1112, they contend for the RACH opportunity. Eventually, multiple UEs 1120 can be discovered by the BS 1110 with a single exhaustive sweep.

In contrast to conventional methods, in inventive methods, because the channel between the BS 1110 and each UE 1120 is potentially different, the BS 1110 needs to probe a different set of beams 1112 for each user. Thus, in the worst case, the discovery time scales with $D_{BS}\tau_{UE}$, as the BS 1110 performs an exhaustive scan to discover all UEs 1120 within a single scan cycle. The relationship between the number of users on the network discovery time according to inventive embodiments will now be discussed. Note that the time for a UE to find the best Rx beam for the given BS beam remains the same in multi-user case, as the UE still aims at discovering a single BS. For the purposes of this discussion, it will be assumed that the network consist of UUEs and a single BS, and the number of users will be U. A set of random variables to denote the number of clusters between the BS and UI I will be defined as $p_i$, and the total number of clusters as P will be defined such that $\Sigma_{i=1}^{U} p_i = P$. According to statistical channel modesl, $p_i$ may be approximated by max{Poisson($\mu$), 1}, $\forall i \in U$ where $\mu=1.8$, for the 28 GHz band. To find the distribution of P, the following theorem is used:

Theorem 2: Let $X_1, X_2, \ldots, X_n$ be n independent random variables with respective moment generating functions $M_{X_i}(s)=\mathbb{Q}(s^{X_i})$ for i=1, 2, . . . , n. Then, the moment generating function of the linear combination $Y=\Sigma_{i=1}^{n} \alpha_i X_i$ is $M_Y(s)=\Pi_{i=1}^{n} M_{X_i}(\alpha_i s)$.

Random variables are defined $X_1, X_2, \ldots, X_U$ such that $X_1 \sim \text{Poisson}(\mu)$, $X_2 \sim \text{Poisson}(2\mu), \ldots, X_U \sim \text{Poisson}(U\mu)$. To differentiate between users, $X_{1,i}$ is used, which are i.i.d. random variables with distribution Poisson($\mu$). Then, $p_i = \max\{X_{i,i}, 1\}, \forall i \in U$.

$E_0$ is defined as the event of having $X_{1,i}<1, \forall i\in U$, $E_1$ as the event of having one user with $X_{1,i}\geq 1$ and other users with $X_{1,j}<1$, and $E_k$ as the event of having k users with $X_{1,i}\geq 1$ and (U−k) users with $X_{1,j}<1$. Using Theorem 2, the piecewise function that represents P can be written as:

$$\begin{cases} U, & \text{if } E_0 \text{ occcurs} \\ \chi_1 + U - 1, & \text{if } E_1 \text{ occcurs} \\ \chi_2 + U - 2, & \text{if } E_2 \text{ occcurs} \\ \vdots \\ \chi_U, & \text{if } E_U \text{ occcurs} \end{cases}$$

Now, let $x_0, x_1, \ldots, x_U$, denote the probabilities of the occurrence of events $E_0, E_i, \ldots, E_U$, respectively. Naturally, $$\sum_{k=0}^{U} x_k = 1.$$

These probabilities can be written as:

$$x_k = \binom{U}{k} Pr(\chi_1 = 0)^{U-k}(1 - Pr(\chi_1 = 0))^k \tag{9}$$

To numerically find an optimal K value, a similar approach is followed to that set forth above to calculate the optimal or an acceptable value of K. Let P* be the 95th-percentile of P, i.e., $F_P(P^*)=0.95$ where $F_P$ denotes the cumulative distribution function of P. To calculate P*, write:

$$Pr(P > P^*) = \sum_{k=0}^{U} x_k Pr(P > P^* \mid E_k \text{ occurs}) = 0.05 \tag{10}$$

Figure 12:
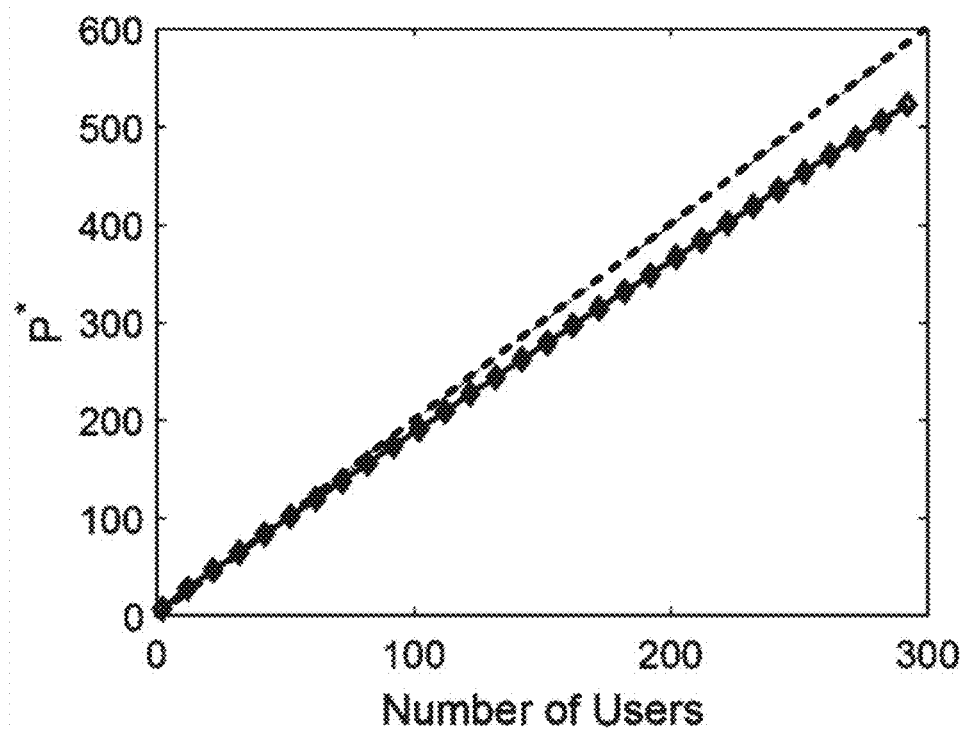
FIG. 12 is a graph illustrating the relation between the number of users in a multiuser scenario and the number of total beam clusters (represented by P*).

As the system consists of U users, each of which with at least one cluster where P*≥U the terms in (10) can be simplified as follows:

$$Pr(P > P^* \mid E_0 \text{ occurs}) = Pr(P^* = U) \quad (11)$$

$$Pr(P > P^* \mid E_1 \text{ occurs}) = Pr(\chi_1 > P^* + 1 - U)$$

$$Pr(P > P^* \mid E_2 \text{ occurs}) = Pr(\chi_2 > P^* + 2 - U)$$

$$\vdots$$

$$Pr(P > P^* \mid E_U \text{ occurs}) = Pr(\chi_U > P^*)$$

where the probabilities in the right hand side can be computed easily as $X_0, X_1, \ldots, X_U$, having generic Poisson distributions. Note that because P* and U are both constants, Pr(P*=U) is either 1 or 0. Clearly, there is no closed-form solution for the P. However, for a given U, one can calculate P* using the methods, set forth, for example according to equations set forth above. FIG. 12 shows an exemplary computation of P* for varying number of users and shows only a slight curvature. The dashed line corresponds to y=2x function, which is shown here as a comparison.

Additional Applications

3DPF and the other techniques disclosed herein can be extended beyond 5G IA to other beamforming architectures and network scenarios. For example, the methods herein can be used in conjunction with multiple RF chains, such as in the hybrid beamforming architecture. Additionally, multi-BS networks such as coordinated multipoint (CoMP) can benefit from the 3DPF algorithm.

As we discussed above, hybrid beamforming architecture utilizes multiple RF chains. The main objective of this design is to properly partition the signal processing between the RF and digital domains, in a way to attain similar performance to fully-digital beamforming. The inventive techniques do not require the availability of multiple RF chains. However, when the Rx comprises of multiple RF chains, 3DPF can simultaneously take measurements from multiple directions, thereby reducing search time. Specifically, if the Rx contains B RF chains, it can simultaneously run the SPF algorithm in parallel in B mutually-exclusive regions, achieving a B-fold decrease in the search time.

3DPF is also applicable to networks that utilize CoMP. CoMP is one of the promising concepts to improve cell edge user data rate and spectral efficiency beyond what is conventionally possible. Under CoMP, transmissions from one or more geographically separated BSs to a single UE are dynamically coordinated in a way to improve average and cell edge throughput. The 3GPP standard defines two different categories of downlink CoMP: coordinated scheduling/beamforming and joint processing CoMP. In the former, the UE data is only available in one BS, but user scheduling and beamforming decisions are made with coordination among the BSs, mostly to reduce inter cell interference. In the latter, the UE data is available in multiple BSs of the network. This means the data can be simultaneously transmitted from multiple transmission points, in order to improve the received signal quality. Note that the joint processing CoMP system is very similar to the multi-user system model discussed above when discussing performance evaluation, but instead of having a single receiving BS and multiple transmitting UEs, CoMP scenarios mainly deal with a single receiving UE and multiple transmitting BSs. This arrangement can be improved according to the inventive methods. For example, if the UE knows in advance how many BSs will transmit SS blocks to itself, it can choose a suitable K to run the 3DPF algorithm with, as discussed above, to efficiently located the optimal beams for each of the base stations. In practice, a UE will actually be in the coverage area of only a few BSs, typically 3. Therefore, the inventive methods support the UE selecting a relatively small K, and then running 3DPF to establish communications with multiple BSs simultaneously.

Hardware and Software Applications

Specific hardware and software on which the inventive methods may be implemented will now be described.

Figure 13:
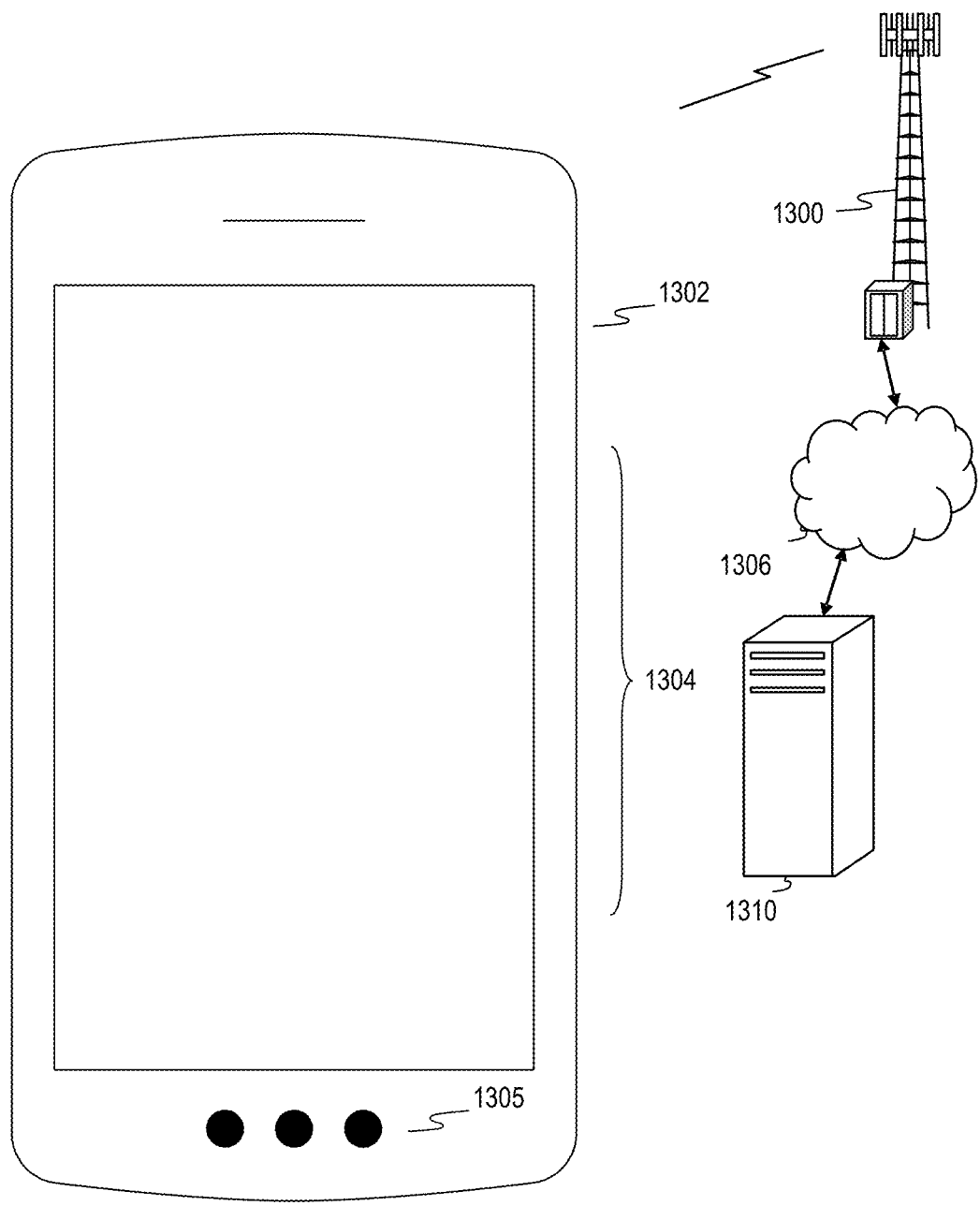
FIG. 13 is a diagram of a wireless communications system including a UE operable for some of the various embodiments of the invention.

FIG. 13 illustrates a wireless communications system including an embodiment of a UE 1302. UE 1302 is operable for implementing inventive methods disclosed herein, but the disclosure should not be limited to these implementations. Though illustrated as a "smart" mobile phone, the UE 1302 may take various forms including a wireless handset, a pager, a personal digital assistant (PDA), a portable computer, a tablet computer, a laptop computer. Many suitable devices combine some or all of these functions. In some inventive embodiments of the disclosure, the UE 1302 is not a general purpose computing device like a portable, laptop or tablet computer, but rather is a special-purpose communications device such as a mobile phone, a wireless handset, a pager, a PDA, or a telecommunications device installed in a vehicle. The UE 1302 may also be a device, include a device, or be included in a device that has similar capabilities but that is not transportable, such as a desktop computer, a set-top box, or a network node. The UE 1302 may support specialized activities such as gaming, inventory control, job control, and/or task management functions, and so on.

The UE 1302 includes a display 1304. The UE 1302's display 1304 also includes a touch-sensitive surface, generally referred to as a touchscreen, for input by a user. The touchscreen may generate a full or reduced, virtual, alphanumeric keyboard and/or other touch sensitive symbols for user input. UE 1302 may also optionally include one or more hard keys 1305, located on the face of UE 1302 and/or around its perimeter or on a back side. Hard keys 1305 will typically have specialized and frequently used functions. UE 1302 may include one or more cameras, microphones, speakers or other input/out devices, which are not illustrated.

The UE 1302 may further accept data entry from the user, including numbers to dial or various parameter values for configuring the operation of the UE 1302. The UE 1302 may further execute one or more software or firmware applications in response to user commands. These applications may configure the UE 1302 to perform various customized functions in response to user interaction. Additionally, the UE 1302 may be programmed and/or configured over-the-air, for example from a wireless base station (e.g., 1300), a wireless access point, or a peer UE 1302.

UE 1302 is capable of exchanging electronic data with BS 1300 as part of a cellular data and/or voice network. When the network is a 5G wireless network, data exchange between UE 1302 and BS 1300 will typically be via directional transmission and reception. Accordingly, both UE 1302 and BS 1300 will have directional antennas, for example, UPA antennas, with which each transceiver may form directional beams.

BS 1300 is typically in connection with a wider wired or wireless network 1306, which may be a service provider network connected to the BS over a wired or wireless backhaul connection, which in turn, may be connected to the internet. One or more servers 1310 are accessible by the BS over the illustrated network connection. Servers 1310 may be general purpose computers having one or more processors in electronic communication with volatile and non-volatile memory, input/output devices, and one or more network interfaces.

Via the broader network 1306, the UE 1302 has access to information on various servers, such as a server 1310. The server 1310 may provide content that may be shown on the display 1304. Alternately, the UE 1302 may access the network 1306 through a peer UE 1302 acting as an intermediary, in a relay type or hop type of connection.

Figure 14:
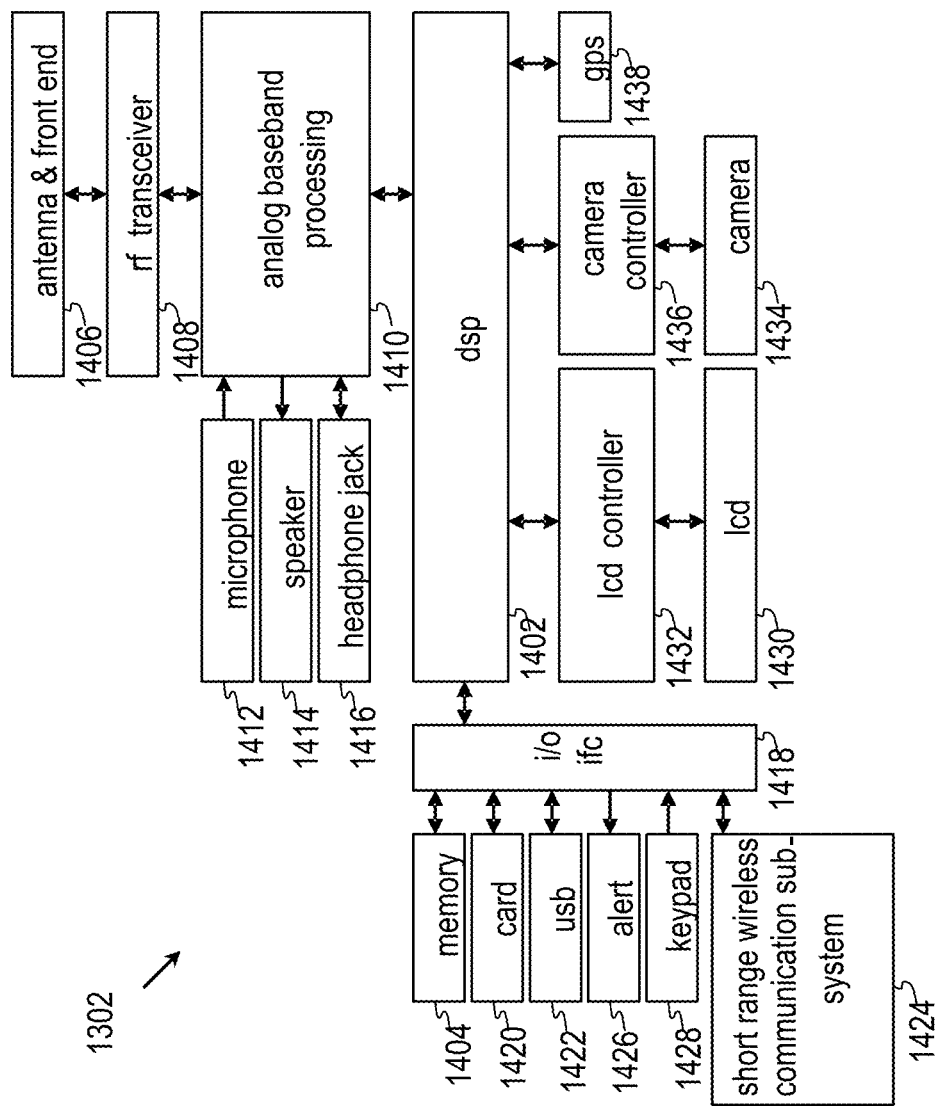
FIG. 14 is a block diagram of a UE operable for some of the various embodiments of the invention.

FIG. 14 shows a block diagram of the UE 1302. While a variety of known components of typical and acceptable UEs are depicted, in an embodiment a subset of the listed components and/or additional components not listed may be included in the UE 1302. The UE 1302 includes a digital signal processor (DSP) 1402 and a memory 1404. In certain embodiments, DSP 1402 is is a microprocessor or CPU, such as the processor 1610 described below in reference to FIG. 16. As shown, the UE 1402 may further include an antenna and front end unit 1406 (containing radiative and beam forming elements, such as those described above in reference to FIG. _), a radio frequency (RF) transceiver 1408, an analog baseband processing unit 1410, a microphone 1412, a speaker 1414, a headphone jack 1416, an input/output interface 1418, a removable memory card 1420, a universal serial bus (USB) port 1422, a short range wireless communication sub-system 1424, an alert 1426 (e.g., one or more illuminable LEDs), a keypad 1428 or other hard keys such as 1305, described above, a liquid crystal display (LCD), which may include a touch sensitive surface 1430, an LCD controller 1432, a charge-coupled device (CCD) or other camera 1434, a camera controller 1436, and a global positioning system (GPS) receiver 1438. In an embodiment, the UE 1302 may include another kind of display that does not provide a touch sensitive screen. In an embodiment, the DSP 1302 may communicate directly with the memory 1404 without passing through the input/output interface 1418.

The DSP 1402 or some other form of controller or central processing unit operates to control the various components of the UE 1302 in accordance with embedded software or firmware stored in memory 1404 or stored in memory contained within the DSP 1402 itself. In addition to the embedded software or firmware, the DSP 1402 may execute other applications stored in the memory 1404 or made available via information carrier media such as portable data storage media like the removable memory card 1420 or via wired or wireless network communications. The application software may comprise a compiled set of machine-readable instructions that configure the DSP 1402 to provide the desired functionality, or the application software may be high-level software instructions to be processed by an interpreter or compiler to indirectly configure the DSP 1402. Such computer readable instructions may cause the DSP 1402 to direct analog baseband processing unit 1410 and rf transceiver 1408 and antenna and front end 1406 to implement the UE-side beamforming, parameter storage, comparison and computation steps of the inventive methods set forth above.

The antenna and front end unit 1406 may be provided to convert between wireless signals and electrical signals, enabling the UE 1302 to send and receive information from a cellular network or some other available wireless communications network or from a peer UE. In an embodiment, the antenna and front end unit 1406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 1406 may include antenna tuning and/or impedance matching components, phase shifters and individual amplifiers for individual elements arrange in a phased-array antenna, other RF power amplifiers, and/or low noise amplifiers.

The RF transceiver 1408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1410 and/or the DSP 1402 or other central processing unit. In some embodiments, the RF Transceiver 1408, portions of the Antenna and Front End 1406, and the analog base band processing unit 1410 may be combined in one or more processing units and/or application specific integrated circuits (ASICs).

The analog base band processing unit 1410 may provide various analog processing of inputs and outputs, for example analog processing of inputs from the microphone 1412 and the headphone jack 1416 and outputs to the speaker 1414. To that end, the analog base band processing unit 1410 may have ports for connecting to the built-in microphone 1412 and the speaker 1414 that enable the UE 1302 to be used as a cell phone. The analog base band processing unit 1410 may provide digital-to-analog conversion in one signal direction and analog-to-digital conversion in the opposing signal direction. In some embodiments, at least some of the functionality of the analog base band processing unit 1410 may be provided by digital processing components, for example by the DSP 1402 or by other central processing units.

The DSP 1402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in an orthogonal frequency division multiplex access (OFDMA) technology application, for the transmitter function the DSP 1402 may perform modulation, coding, interleaving, inverse fast Fourier transforming, and cyclic prefix appending, and for a receiver function the DSP 1402 may perform cyclic prefix removal, fast Fourier transforming, deinterleaving, decoding, and demodulation.

The DSP 1402 may communicate with a wireless network via the analog baseband processing unit 1410. In some embodiments, the communication may provide Internet connectivity, enabling a user to gain access to content on the Internet and to send and receive e-mail or text messages. The input/output interface 1418 interconnects the DSP 1402 and various memories and interfaces. The memory 1404 and the removable memory card 1420 may provide software and data to configure the operation of the DSP 1402, for example, to enable DSP 1402 to perform or direct the inventive method steps set forth above. Among the interfaces may be the USB interface 1422 and the short range wireless communication sub-system 1424. The USB interface 1422 may be used to charge the UE 1302 and may also enable the UE 1302 to function as a peripheral device to exchange information with a personal computer or other computer system. The short range wireless communication sub-system 1424 may include an infrared port, a Bluetooth interface, an IEEE 802.11 compliant wireless interface, or any other short range wireless communication sub-system, which may enable the UE 1302 to communicate wirelessly with other nearby mobile devices and/or wireless base stations.

The input/output interface 1418 may further connect the DSP 1402 to the alert 1426 that, when triggered, causes the UE 1302 to provide a notice to the user, for example, by ringing, playing a melody, or vibrating. The alert 1426 may serve as a mechanism for alerting the user to any of various events such as an incoming call, a new text message, and an appointment reminder by silently vibrating, or by playing a specific pre-assigned melody for a particular caller.

UE 1302 includes an input mechanism by way of LCD 1430, which may include touch screen capability and also display text and/or graphics to the user. The LCD controller 1432 couples the DSP 1402 to the LCD 1430.

The camera 1434, if equipped, enables the UE 1302 to take digital pictures. The DSP 1402 communicates with the CCD camera 1434 via the camera controller 1436. In another embodiment, a camera operating according to a technology other than Charge Coupled Device cameras may be employed. The GPS receiver 1438 is coupled to the DSP 1402 to receive and decode global positioning system signals, thereby enabling the UE 1302 to determine its position. Various other peripherals may also be included to provide additional functions, e.g., radio and television reception.

Figure 10:
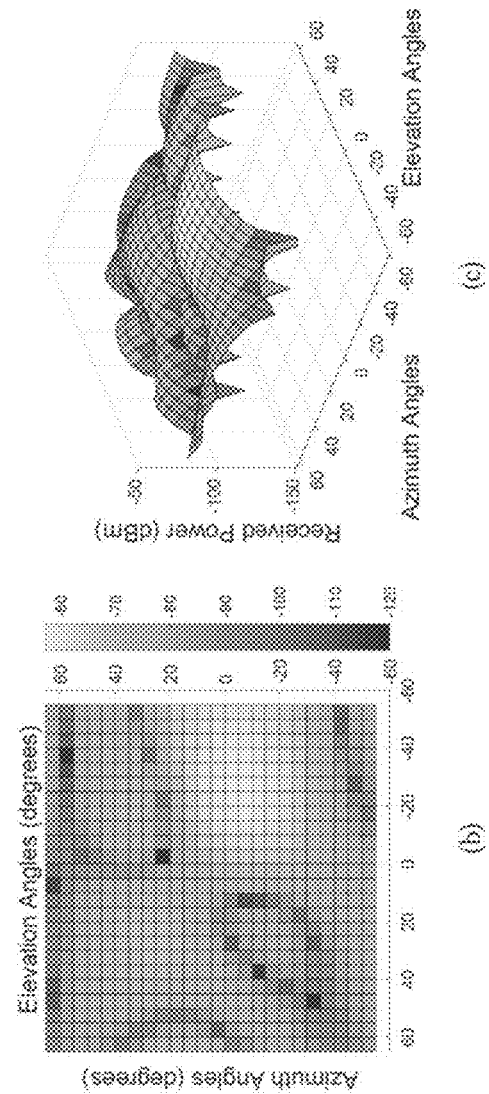
FIGS. 10(a)-(c) depict simulation conditions used to compare inventive beam alignment methods with conventional methods.
Figure 15:
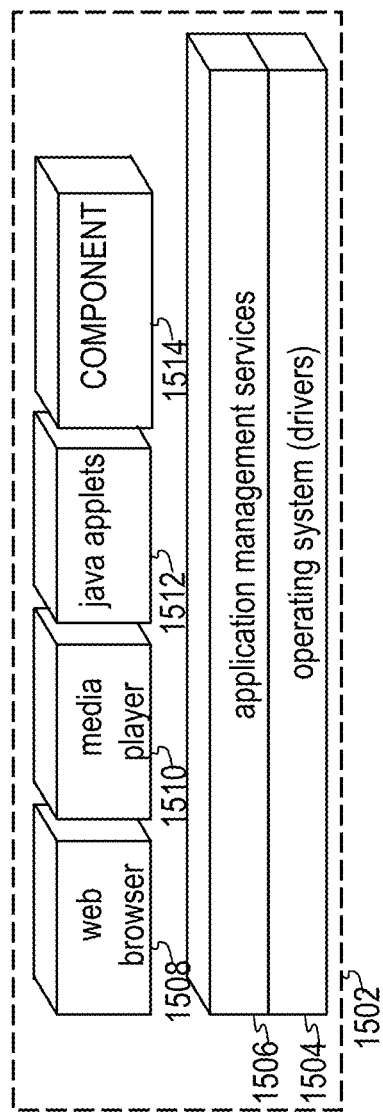
FIG. 15 is a diagram of a software environment that may be implemented on a UE and/or a base station operable for some of the various embodiments of the invention.

FIG. 15 illustrates a software environment 1502 that may be implemented by the DSP 1402. The DSP 1402 executes operating system drivers 1504 that provide a platform from which the rest of the software operates. The operating system drivers 1504 provide drivers for the UE hardware with standardized interfaces that are accessible to application software. The operating system drivers 1504 include application management services ("AMS") 1506 that transfer control between applications running on the UE 1302. Also shown in FIG. 10 are a web browser application 1508, a media player application 1510, and Java applets 1512. The web browser application 1508 configures the UE 1302 to operate as a web browser, allowing a user to enter information into forms and select links to retrieve and view web pages. The media player application 1510 configures the UE 1302 to retrieve and play audio or audiovisual media. The Java applets 1512 configure the UE 1302 to provide games, utilities, and other functionality. A component 1514 might provide functionality described herein.

Figure 16:
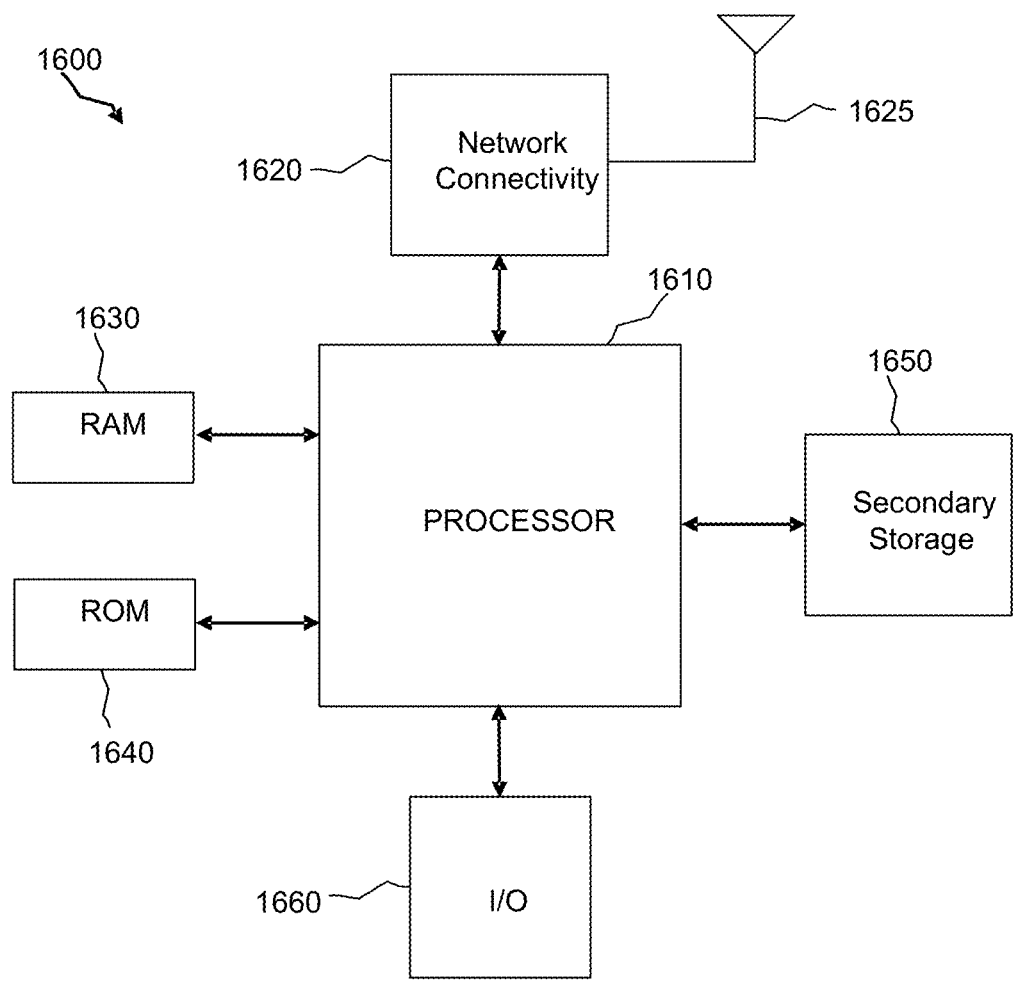
FIG. 16 is an illustrative processing system suitable for some of the various embodiments of the disclosure.

The UE 1302, base station 1300, and other components described above might include a processing component that is capable of executing instructions related to the actions described above. FIG. 16 illustrates an example of a system 1600 that includes a processing component 1610 suitable for implementing one or more embodiments disclosed herein. In addition to the processor 1610 (which may be referred to as a central processor unit (CPU or DSP), the system 1600 might include network connectivity devices 1620, random access memory (RAM) 1630, read only memory (ROM) 1640, secondary storage 1650, and input/output (I/O) devices 1660. In some cases, some of these components may not be present or may be combined in various combinations with one another or with other components not shown. These components might be located in a single physical entity or in more than one physical entity. Any actions described herein as being taken by the processor 1610 might be taken by the processor 1610 alone or by the processor 1610 in conjunction with one or more components shown or not shown in the drawing.

The processor 1610 executes instructions, codes, computer programs, or scripts that it might access from the network connectivity devices 1620, RAM 1630, ROM 1640, or secondary storage 1650 (which might include various disk-based systems such as hard disk, floppy disk, or optical disk). While only one processor 1610 is shown, multiple processors may be present. Thus, while instructions may be discussed as being executed by a processor, the instructions may be executed simultaneously, serially, or otherwise by one or multiple processors. The processor 1610 may be implemented as one or more CPU chips.

The network connectivity devices 1620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1620 may enable the processor 1610 to communicate with the Internet or one or more telecommunications networks or other networks from which the processor 1610 might receive information or to which the processor 1610 might output information.

The network connectivity devices 1620 might also include one or more transceiver components 1625 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1625 might include separate receiving and transmitting units or a single transceiver. Information transmitted or received by the transceiver 1625 may include data that has been processed by the processor 1610 or instructions that are to be executed by processor 1610. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art. Exemplary network connectivity and transceiver components include the antenna and RF transceiver components set forth above with respect to FIG. 14, i.e., antenna and front end 1406, RF transceiver 1408, baseband processor 1410, short range wireless communication subsystem 1424, etc.

The RAM 1630 might be used to store volatile data and perhaps to store instructions that are executed by the processor 1610. The ROM 1640 is a non-volatile memory device that typically has a smaller memory capacity than the memory capacity of the secondary storage 1650. ROM 1640 might be used to store instructions and perhaps data that are read during execution of the instructions. Access to both RAM 1630 and ROM 1640 is typically faster than to secondary storage 1650. The secondary storage 1650 is typically comprised of one or more disk drives or tape drives and might be used for non-volatile storage of data or as an over-flow data storage device if RAM 1630 is not large enough to hold all working data. Secondary storage 1650 may be used to store programs that are loaded into RAM 1630 when such programs are selected for execution.

The I/O devices 1660 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1625 might be considered to be a component of the I/O devices 1660 instead of or in addition to being a component of the network connectivity devices 1620. Some or all of the I/O devices 1660 may be substantially similar to various components depicted in the previously described drawing of the UE 1302, such as the display 1304 and the input 1305.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

Accordingly, the invention should not be viewed as being limited to the disclosed embodiment(s). Particularly, although an embodiment of the present invention is described as an efficient initial access (IA) method for 5G mmW cellular systems, it can also apply to non-5G systems operating in mmW in upper centimeter bands. A good example of non-5G systems operating in the mmW band is Wi-Gig devices, which operate in unlicensed bands between 59 and 71 GHz (which is a part of the mmW spectrum), but are not 5G related. Wi-Gig provides similar operation to present day Wi-Fi, but because of its operation in mmW bands, communications is generally done directionally (with beamforming). Such Wi-Gig systems are standardized by the IEEE 802.11ad standard. The terminology used with Wi-Gig (same as Wi-Fi) is access point (AP) instead of base station (BS), and station (STA) instead of user equipment (UE).

Similarly, the invention is also not limited to mmW bands. It applies to any directional wireless communication system in which devices need to discover each other directionally. Higher frequency bands, including but not limited to mmW bands, are characterized by reduced scattering, which means that operation over these bands is often directional. Conventionally, frequencies from 30 GHz and above are referred to as mmW, but the present invention applies to lower frequencies as well (e.g., 24-30 GHz bands are particularly significant, because they are a part of the 5G bands, but technically speaking, they are upper centimeter wave bands, not mmW bands).

Moreover, beamforming and alignment methods according to the invention are applicable to any antenna having directional properties. While the invention has been described in terms of forming beams in a 3-D phased array antenna by applying complex weights to its elements, the alignment methods described herein are equally applicable to other active or even passive directional antennas. For example, the invention may also be used to align a switched beam antenna (i.e., by applying gain to a particular directional lobe), or to align a physical directional antenna, which may be physically scanned to form beams in various directions.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method of aligning an antenna beam to a source of signals, comprising:
   dividing an angular search space into a plurality of angular search zones;
   measuring received signal strength within each angular search zone and, on the basis of the measurement, determining a direction of maximum received signal strength for each search zone; and
   comparing the maximum signal strengths for each of the search zones, and aligning the antenna beam along the direction of overall maximum signal strength.

2. The method of claim 1, wherein the step of dividing the angular search space into a plurality of search zones comprises:
   selecting a total number of angular search zones such that the probability that each angular search zone contains a single peak in a function of signal strength versus angle of arrival at the antenna exceeds a predetermined threshold.

3. The method of claim 1, wherein the step of determining a direction of maximum received signal strength for each search zone comprises, within each search zone, taking received signal strength samples using a plurality of probe beams oriented in different directions according to a binary search algorithm.

4. The method of claim 1, wherein the step of determining a direction of maximum received signal strength for each search zone includes the steps of:
   (1) defining a baseline receive beam oriented at the center of the search zone and sampling a baseline received signal strength along the baseline receive beam;
   (2) defining a plurality of probe receive beams at angles surrounding baseline receive beam and sampling received signal strength along the probe receive beams, and on that basis, determining a direction in which received signal strength is rising relative to the baseline beam;
   (3) defining a new baseline receive beam in the angular direction of the probe beam that was defined in the direction of rising signal strength and sampling a new baseline received signal strength along the baseline receive beam;

(4) defining a new plurality of probe receive beams at angles surrounding the new baseline receive beam and sampling received signal strength along the new probe receive beams, and on that basis, determining a direction in which received signal strength is rising relative to the new baseline beam;

repeating steps 3-4 until a final probe receive beam is defined that exhibits a signal strength within a predefined range relative to a baseline beam, and defining the final probe beam as the direction of maximum signal strength for the zone.

5. The method of claim 1, wherein the antenna beam is generated by a directional antenna on a cellular user equipment and the source of signals is a cellular base station.

6. The method of claim 1, wherein the antenna beam is generated by an antenna at a first transceiver, and the source of signals is a second transceiver.

7. The method of claim 6, wherein the first transceiver and the second transceiver are cellular user equipment.

8. The method of claim 6, wherein the first and second transceivers are operating in the 5G frequency domain.

9. The method of claim 1, wherein the source of signals is transmitting in the frequency band between 20 to 30 GHz.

10. The method of claim 1, wherein the antenna beam is formed by a uniform planar phased array antenna.

11. The method of claim 1, wherein the antenna is in electrical communication with a cellular user equipment and the source of signals is a cellular base station, and wherein antenna beams are formed by the user equipment by selecting among a set of predefined beams stored in a user equipment codebook.

12. A method of forming a beam between a cellular base station ("BS") having a directional antenna with a cellular user equipment ("UE") having a directional antenna, compromising:

receiving a first directional signal from the base station, the received signal containing a BS beam id;

forming a directional receive beam at UE by:
dividing an angular search space into angular zones, such that the probability that each angular search zone contains a single peak in a function of received signal strength versus angle of arrival at the UE antenna exceeds a predetermined threshold;

locating a receive beam within each angular search zone in the direction of peak received signal strength, and comparing the beams with the highest received signal strength within each zone across zones to determine a receive beam having the highest overall received signal strength, and forming a beam along the direction of having highest overall received signal strength.

13. The method of claim 12, wherein the step of locating a receive beam within each angular search zone in the direction of peak received signal strength comprises iteratively forming directional receive beams within each angular zone, measuring received signal strength with these beams, and determining the beam with the highest received signal strength within each zone.

14. The method of claim 13, wherein the step of iteratively forming directional receive beams within each angular zone comprises implementing a binary search algorithm to locate the direction of peak received signal strength within the zone.

15. The method of claim 14, wherein the step of implementing a binary search algorithm to locate the direction of peak received signal strength within the zone comprises:

(1) defining a baseline receive beam oriented at a center of the zone and sampling a baseline received signal strength along the baseline receive beam;

(2) defining a plurality of probe receive beams at angles surrounding the baseline receive beam and sampling received signal strength along the probe receive beams, and on that basis, determining a direction in which received signal strength is rising relative to the baseline beam;

(3) defining a new baseline receive beam along the direction of the probe beam that was defined in the direction of rising signal strength and sampling a new baseline received signal strength along the baseline receive beam;

(4) defining a new plurality of probe receive beams at angles surrounding the new baseline receive beam and sampling received signal strength along the probe receive beams, and on that basis, determining a direction in which received signal strength is rising relative to the new baseline beam, where the new plurality of probe beams have less angular deviation from the new baseline beam as the previous set of probe beams;

repeating steps 3-4 until a final probe beam is defined that exhibits no rising signal strength relative to a baseline beam.

16. The method of claim 12, further comprising storing a data record comprising a BS beam id, a selected best UE beam corresponding to the BS beam id, and a measure of signal quality on a link employing the BS beam and the selected best UE beam.

17. The method of claim 16, further comprising receiving additional directional signals from the base station, the additional received signals containing additional BS beam ids, forming corresponding receive beams at the UE, the receive beams being associated with the highest obtainable received signal strength, and storing data records comprising the BS beam ids, selected best UE beams corresponding to the BS beam ids, and a measure of signal quality on a link employing each BS beam and the corresponding best UE beam.

18. The method of claim 17, comprising reviewing the stored data records and, on the basis of the review, selecting from among pairs of BS beams and UE beams the beam pair associated with the highest overall signal strength.

19. The method of claim 12, wherein the received signal is a BS synchronization signal block.

20. A method of aligning an antenna beam of a first transceiver with an antenna beam of a second transceiver, comprising:

(1) at the first transceiver, forming a baseline beam in a baseline direction and transmitting a signal along the baseline beam;

(2) at the second transceiver, dividing an angular search space into angular zones, such that the probability that each angular search zone contains a single peak in a function of received signal strength versus angle of arrival at the UE antenna exceeds a predetermined threshold;

locating a receive beam within each angular search zone in the direction of peak received signal strength, and comparing the beams with the highest received signal strength within each zone across zones to determine a receive beam having the highest overall received signal strength;

(3) at the second receiver, transmitting a reply message along a transmit beam defined in the same direction as the receive beam having the highest overall received signal strength;
(4) at the first transceiver, receiving the reply message along a receive beam defined in the baseline direction and a plurality of probe beams angularly surrounding the baseline direction, comparing a received signal strength for the receive beam and the probe beams, and determining on the basis of the comparison a direction of rising receive signal strength;
(5) at the first transceiver, defining a new baseline transmit beam in the direction of rising receive signal strength.

\* \* \* \* \*